US009442637B1

(12) United States Patent
Kocsor

(10) Patent No.: US 9,442,637 B1
(45) Date of Patent: Sep. 13, 2016

(54) HIERARCHICAL NAVIGATION AND VISUALIZATION SYSTEM

(71) Applicant: Xdroid Kft., Szeged (HU)

(72) Inventor: András Kocsor, Szeged (HU)

(73) Assignee: XDROID KFT, Budapest (HU)

( * ) Notice: Subject to any disclaimer, the term of this patent is extended or adjusted under 35 U.S.C. 154(b) by 427 days.

(21) Appl. No.: 13/919,356

(22) Filed: Jun. 17, 2013

(51) Int. Cl.
*G06F 3/14* (2006.01)
*G06F 3/0484* (2013.01)

(52) U.S. Cl.
CPC .................................. *G06F 3/0484* (2013.01)

(58) Field of Classification Search
CPC .................................. G06F 3/14; G06F 3/17
USPC .................. 715/202, 776; 717/144; 707/640; 702/116; 1/1; 375/240.03
See application file for complete search history.

(56) References Cited

U.S. PATENT DOCUMENTS

| | | | | |
|---|---|---|---|---|
| 2002/0069218 A1* | 6/2002 | Sull | ................... | G06F 17/30796 715/202 |
| 2005/0160411 A1* | 7/2005 | Sangal | ...................... | G06F 8/20 717/144 |
| 2008/0010304 A1* | 1/2008 | Vempala | .............. | G06F 17/3071 |
| 2009/0144011 A1* | 6/2009 | Kumar Nath | .......... | G01C 25/00 702/116 |
| 2009/0248716 A1* | 10/2009 | Mohare | ............. | G06F 17/30917 |
| 2012/0078845 A1* | 3/2012 | Kasbekar | ............. | G06Q 10/107 707/640 |
| 2013/0177076 A1* | 7/2013 | Itani | ................. | H04N 19/00587 375/240.03 |

* cited by examiner

*Primary Examiner* — Ruay Ho
(74) *Attorney, Agent, or Firm* — Shanti Hill, Esq.; Beusse Wolter Sanks & Maire, PLLC

(57) ABSTRACT

A unique method and system is disclosed for organizing and visualizing hierarchical information. It comprises an editor and a visualization engine. The editor visually organizes information elements into hierarchy by iterating elementary (binarization) steps. The binarization step splits the information elements and a quadrangular space into two parts and associates them with each other. A user may refine each partition to unlimited depth by drilling down to new level. This way, a hierarchical structure is created which is visually grouped into levels by so-called covering sets. The visualization engine, which might work independently from the editor, renders the covering sets into quadrangular-shaped visualization spaces, visualizing compact space-partitions. Several techniques aid rendering and enhanced visualization, such as windowing, visualization rules, grids, equal and alternate splitting. Users navigate in the hierarchy by zooming or moving directions. There are countless usage areas including news, education, presentations, realtime visualization.

5 Claims, 28 Drawing Sheets

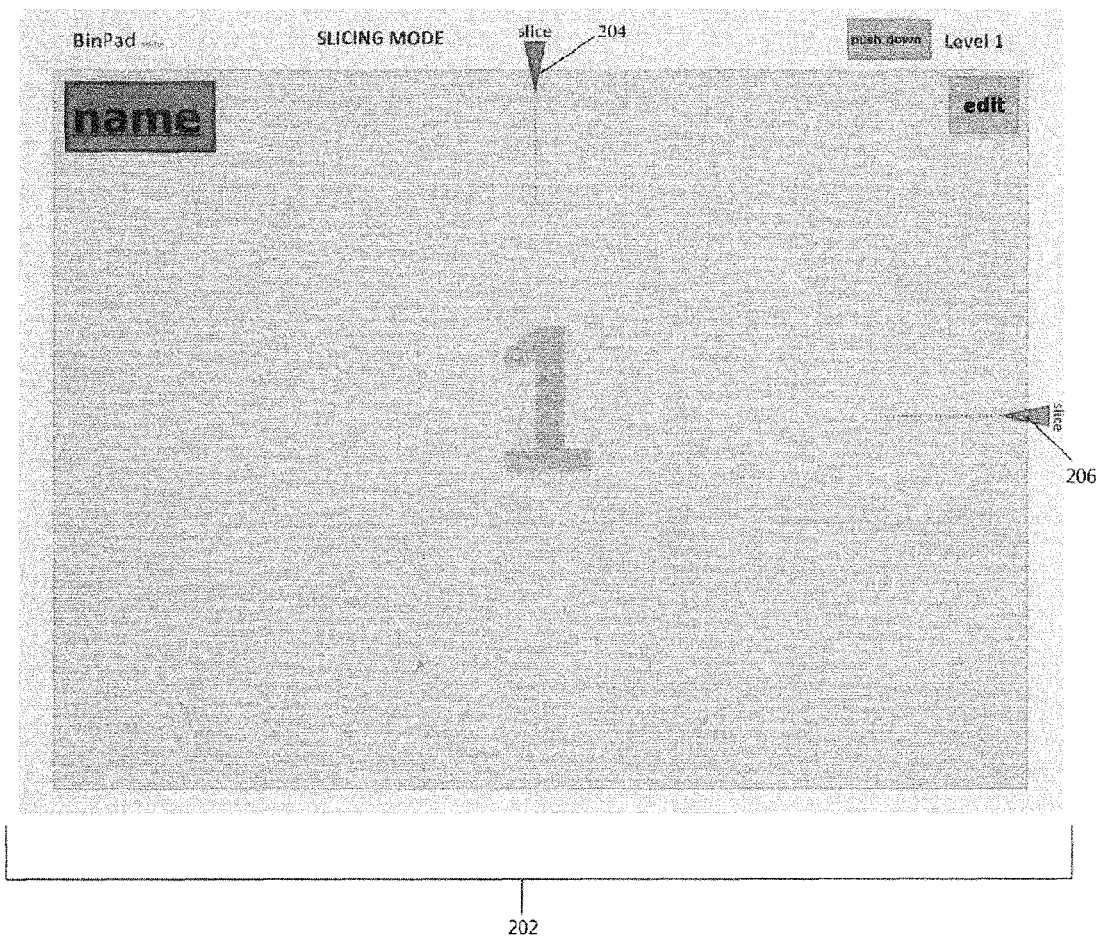
Fig. 2 Bin Pad editor initial screen

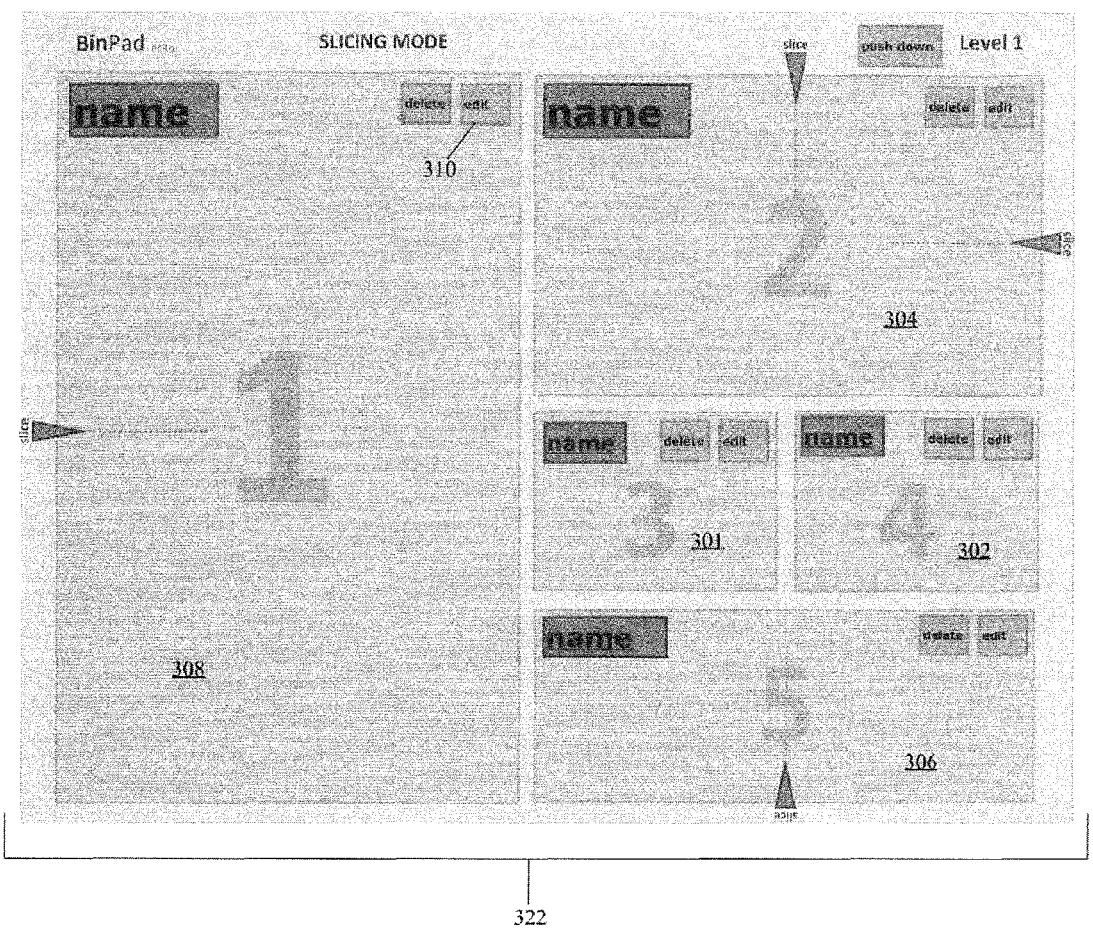
Fig. 3A Building hierarchy with Bin Pad editor

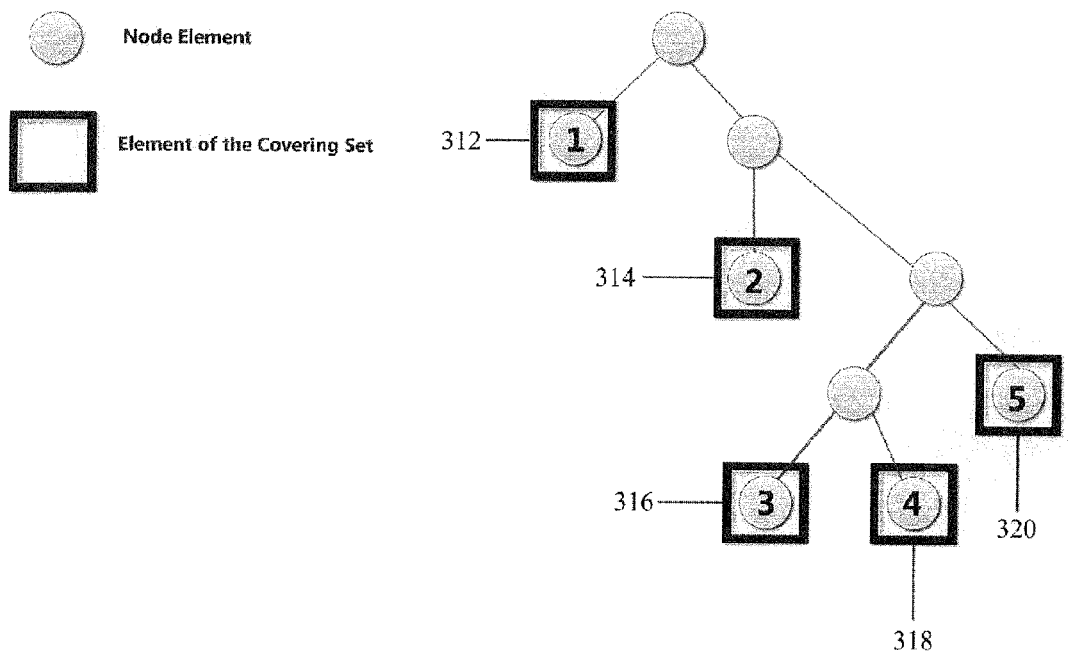

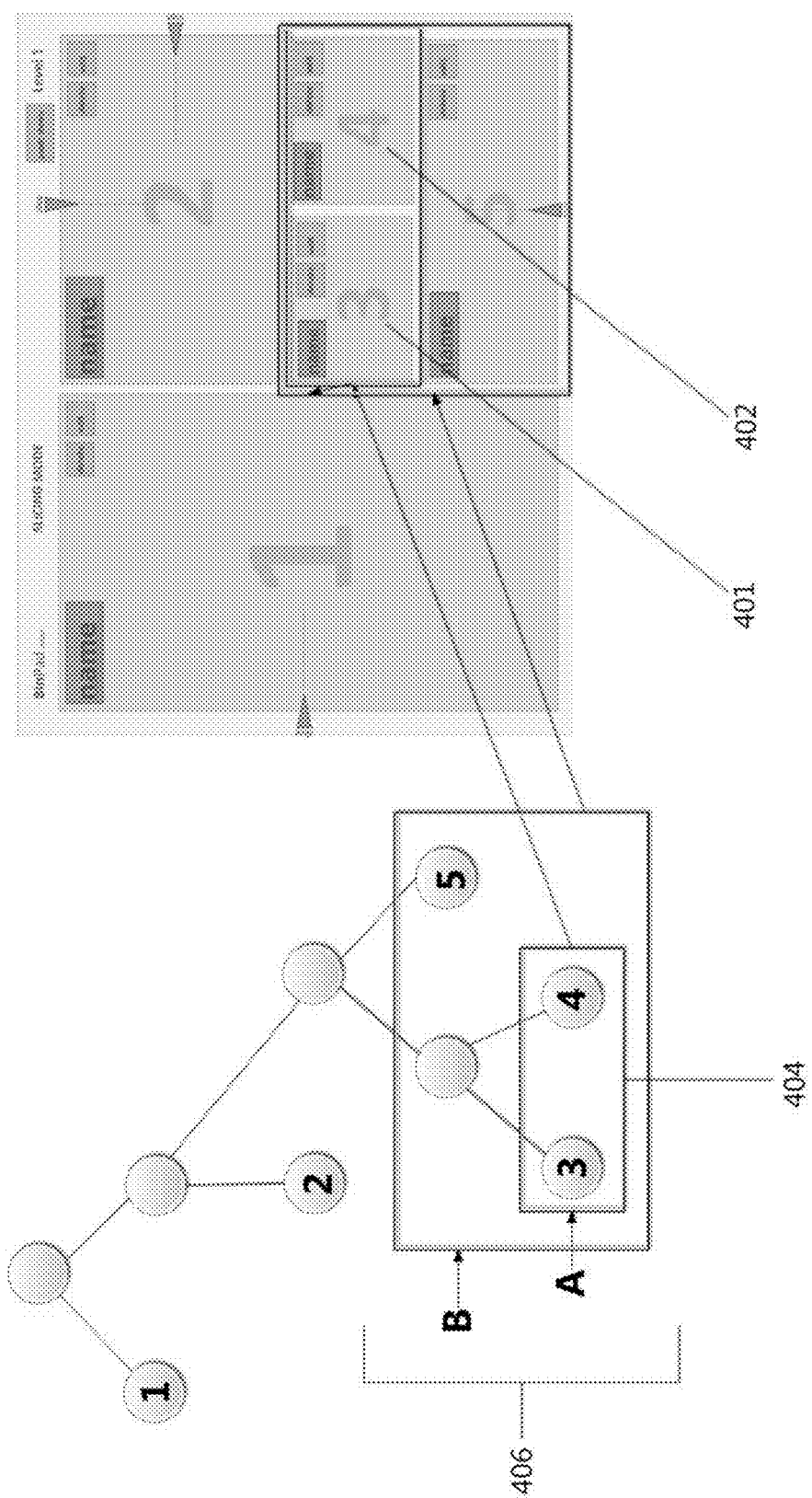

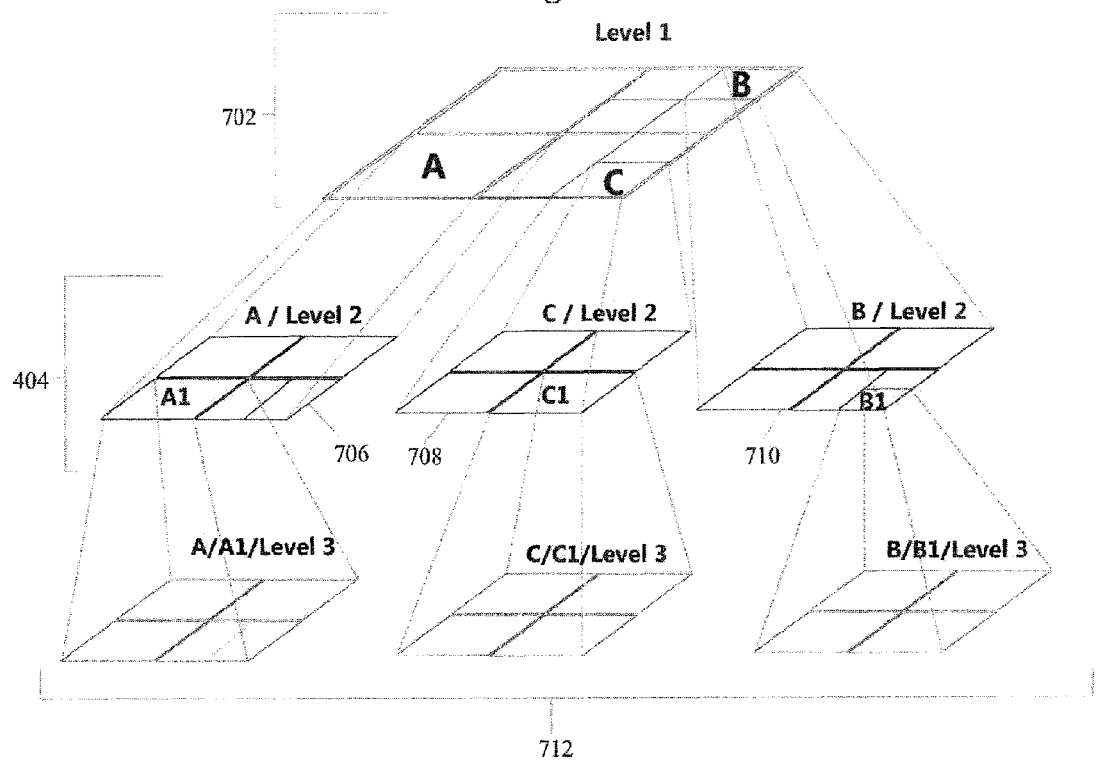

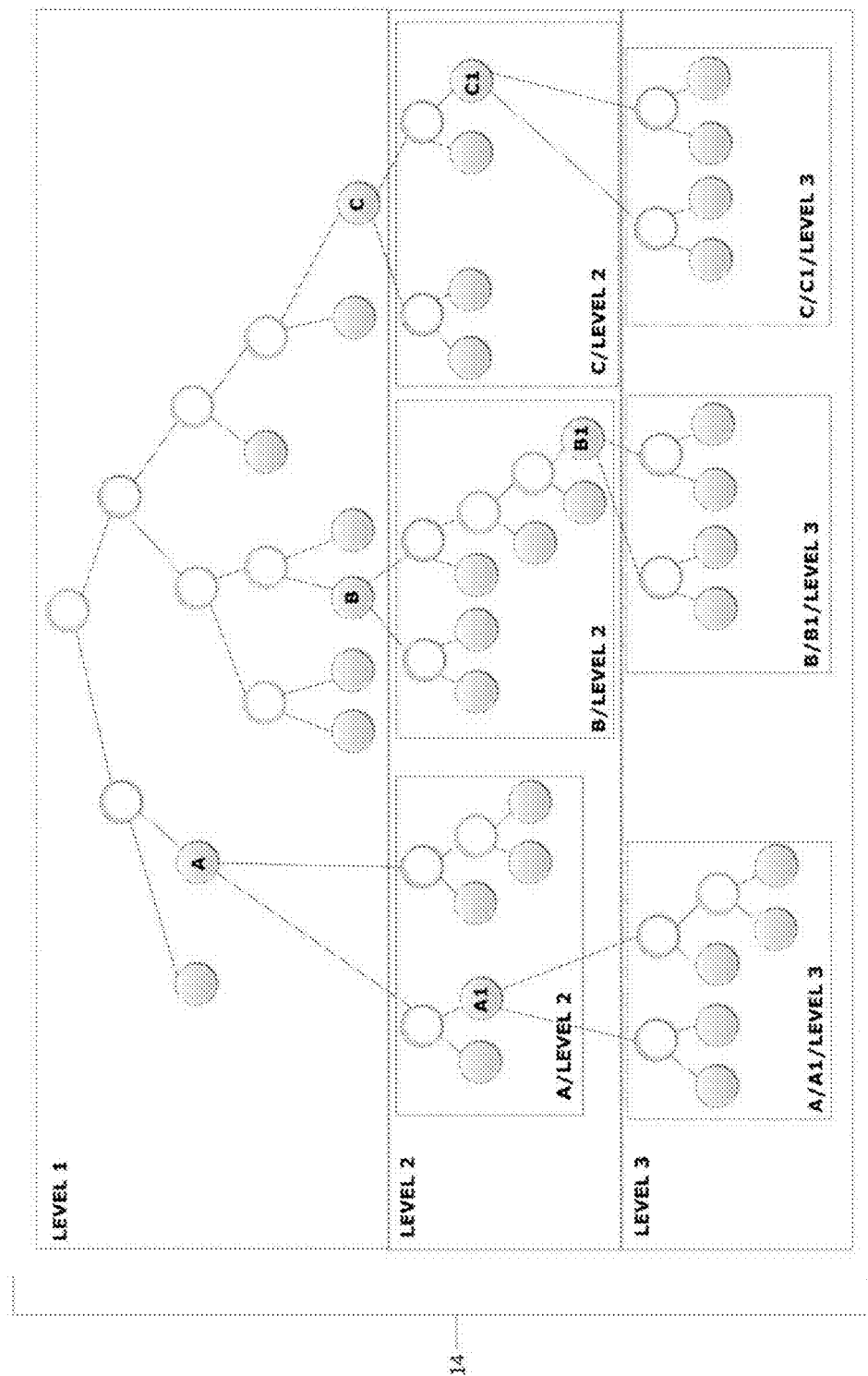

Fig. 8 Displaying engine
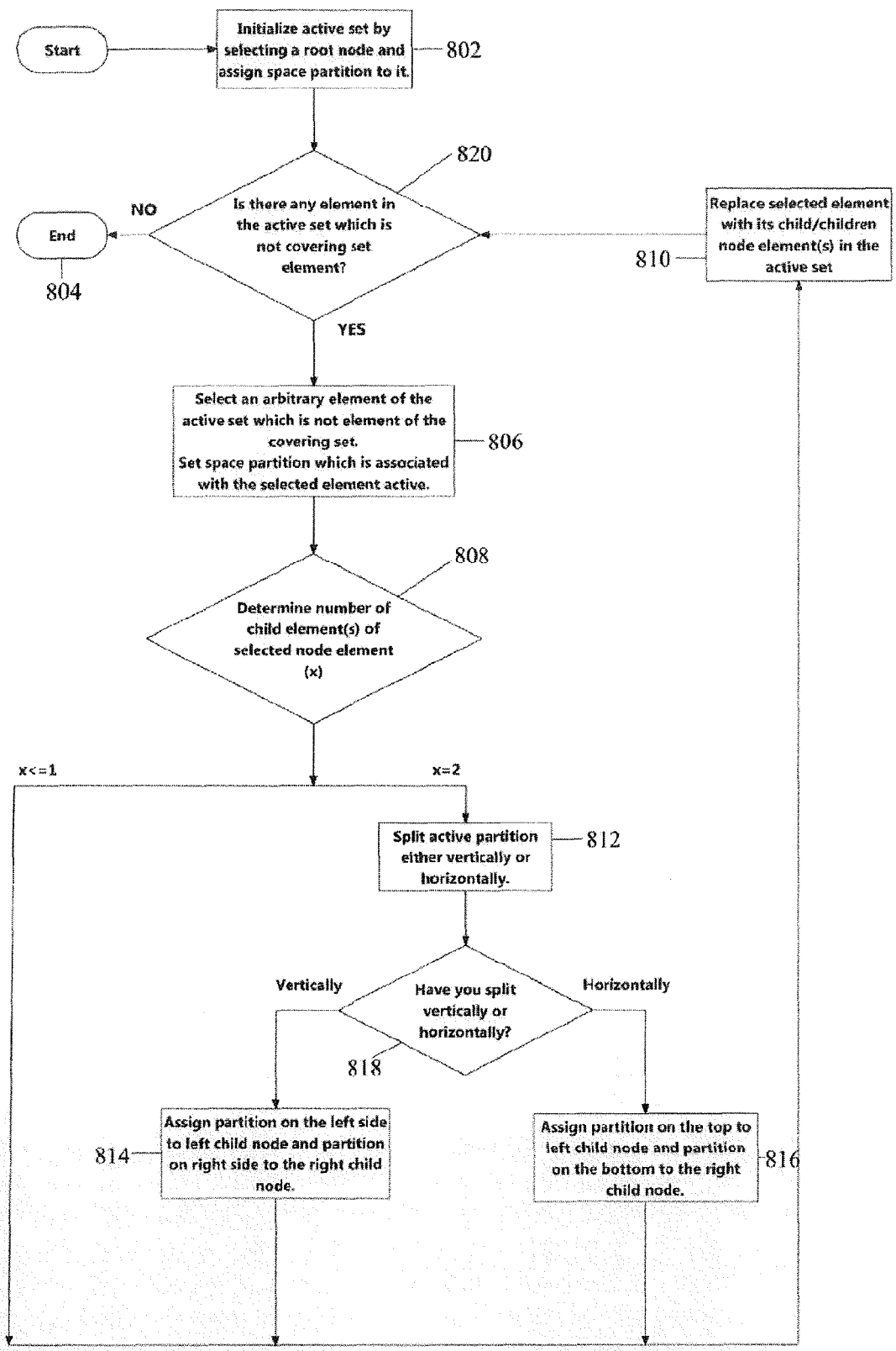

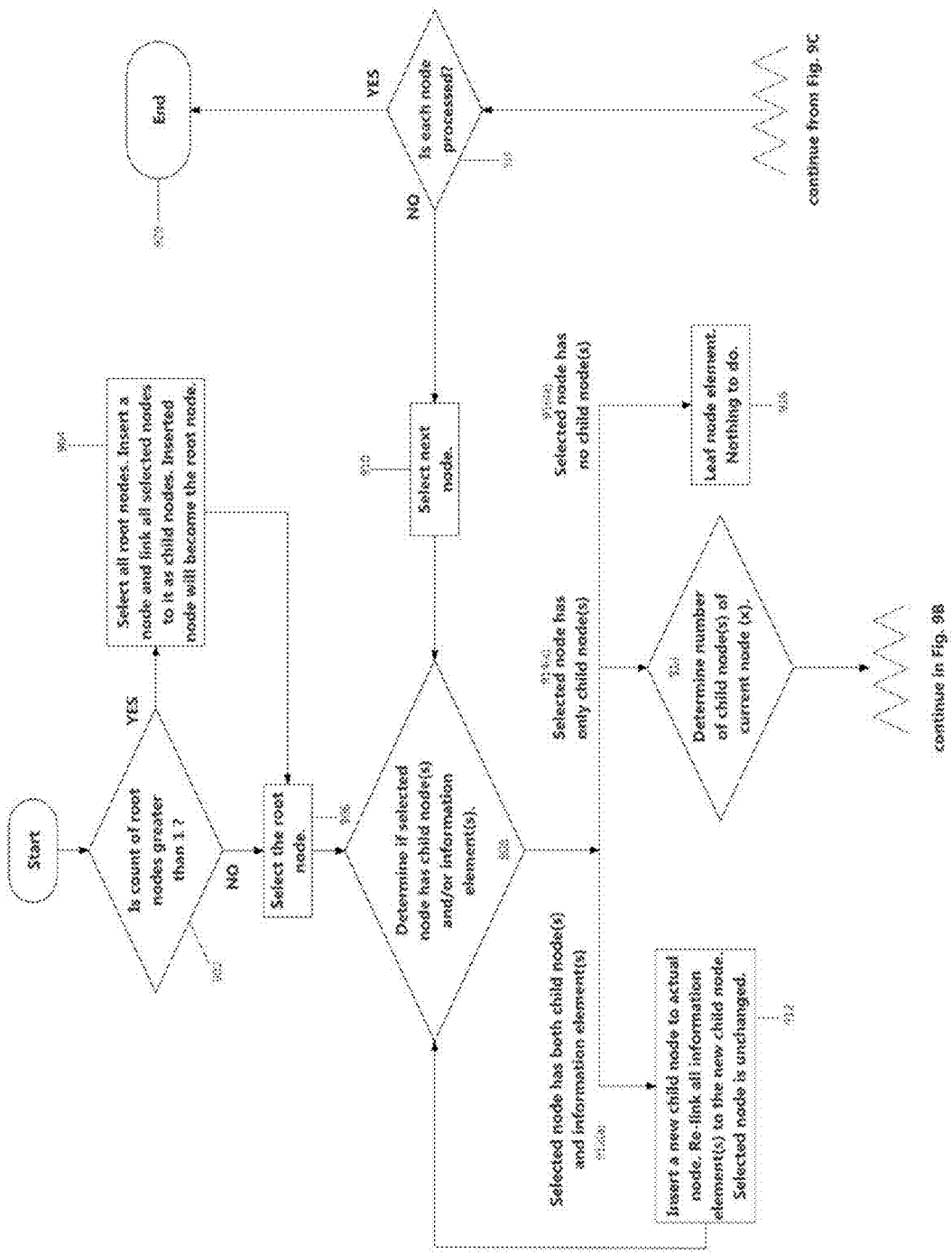

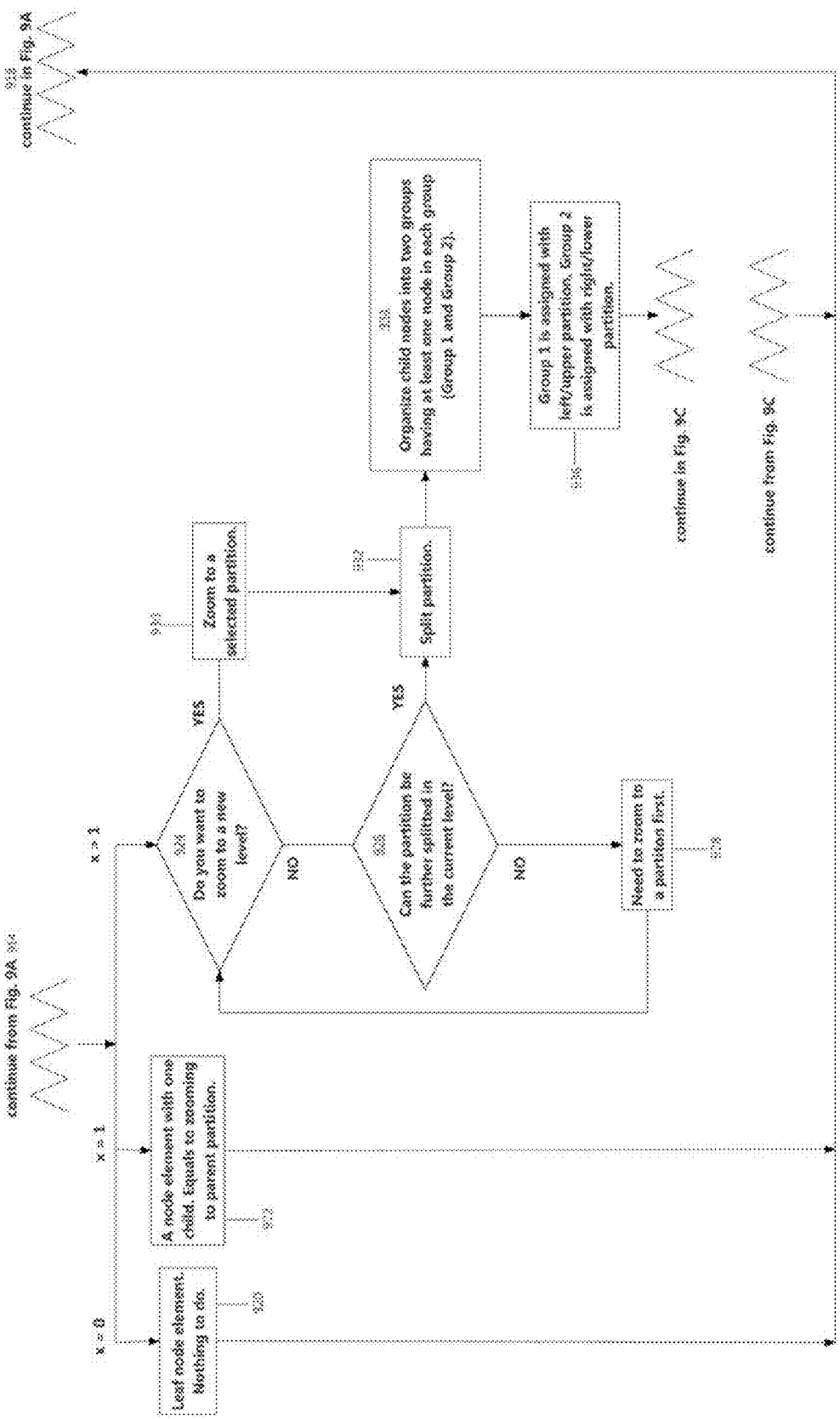

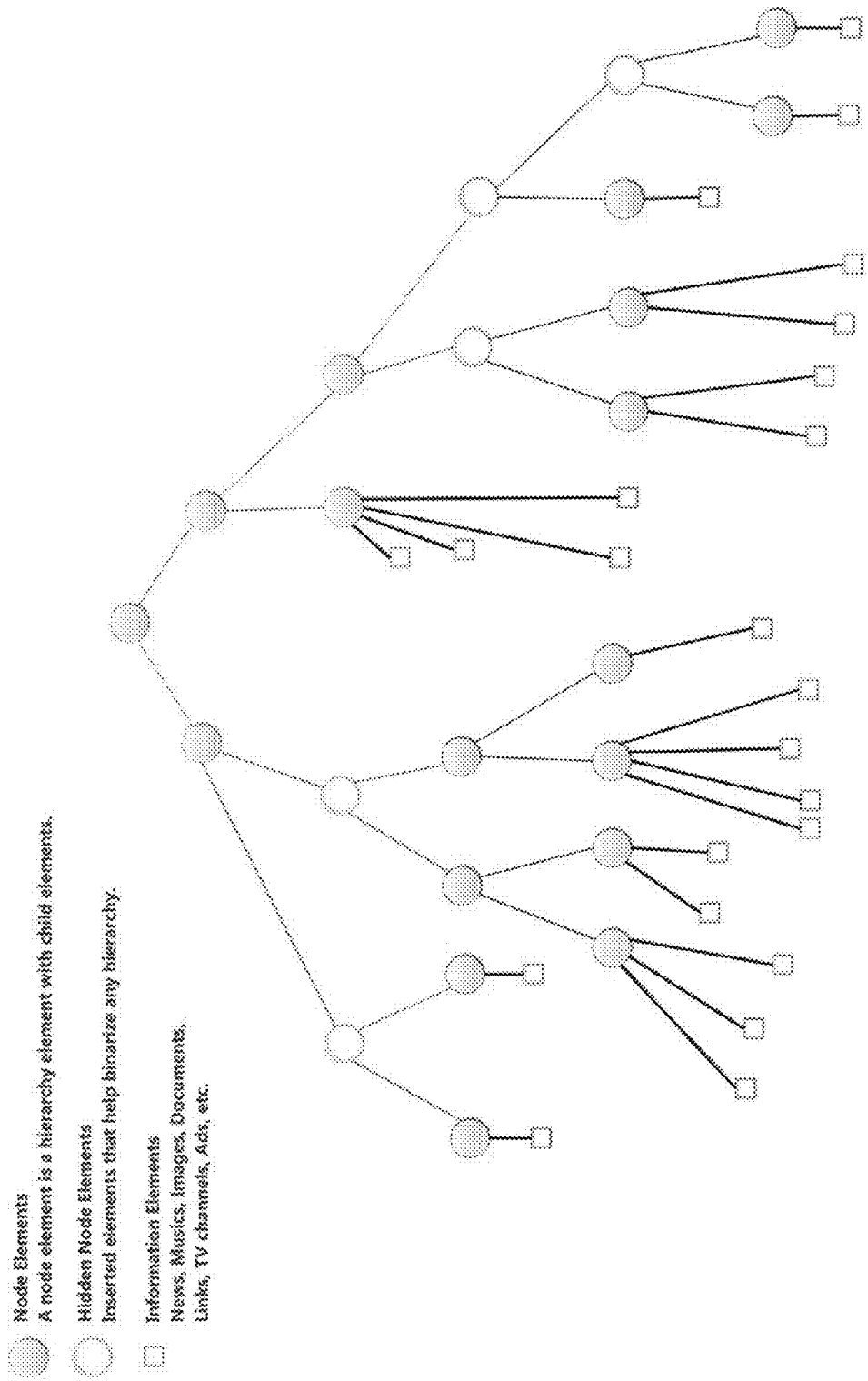

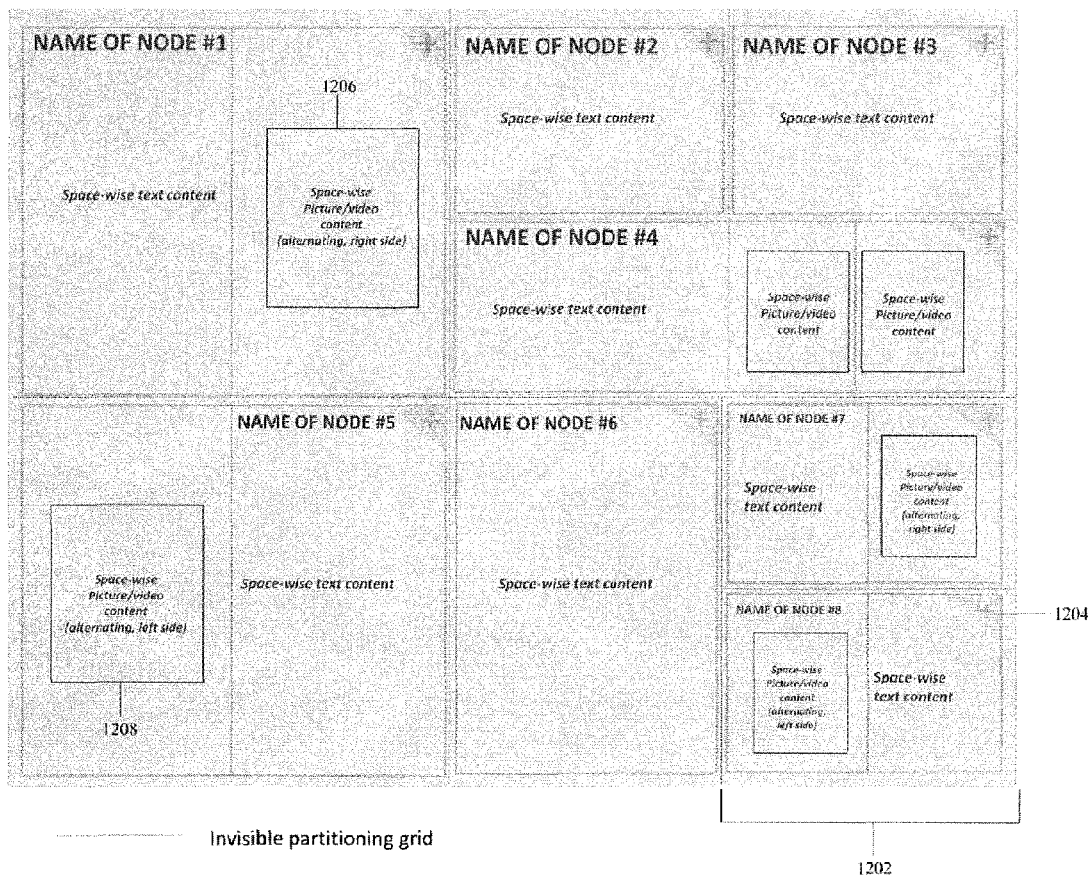
Fig. 12 Simplified Visualization

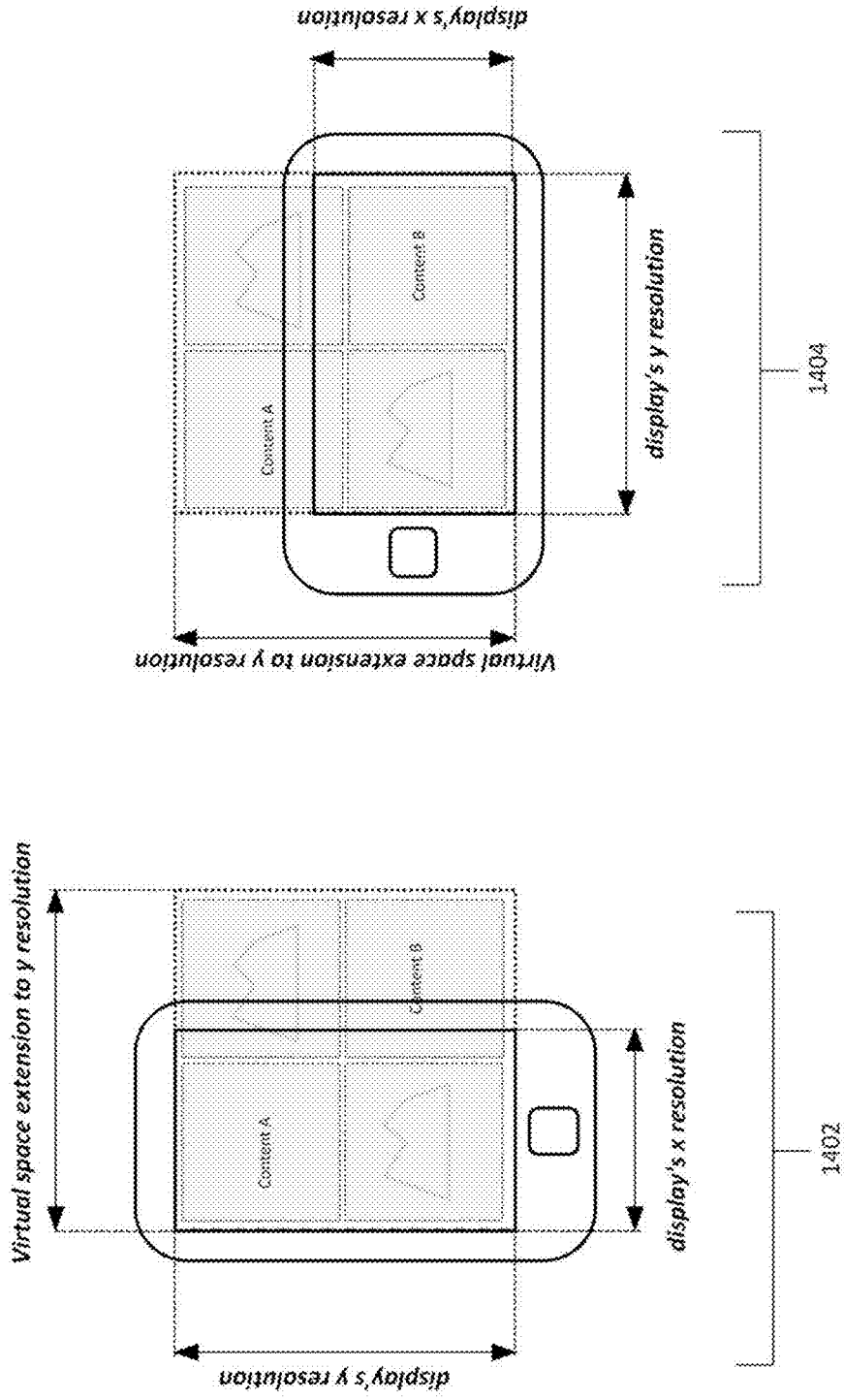

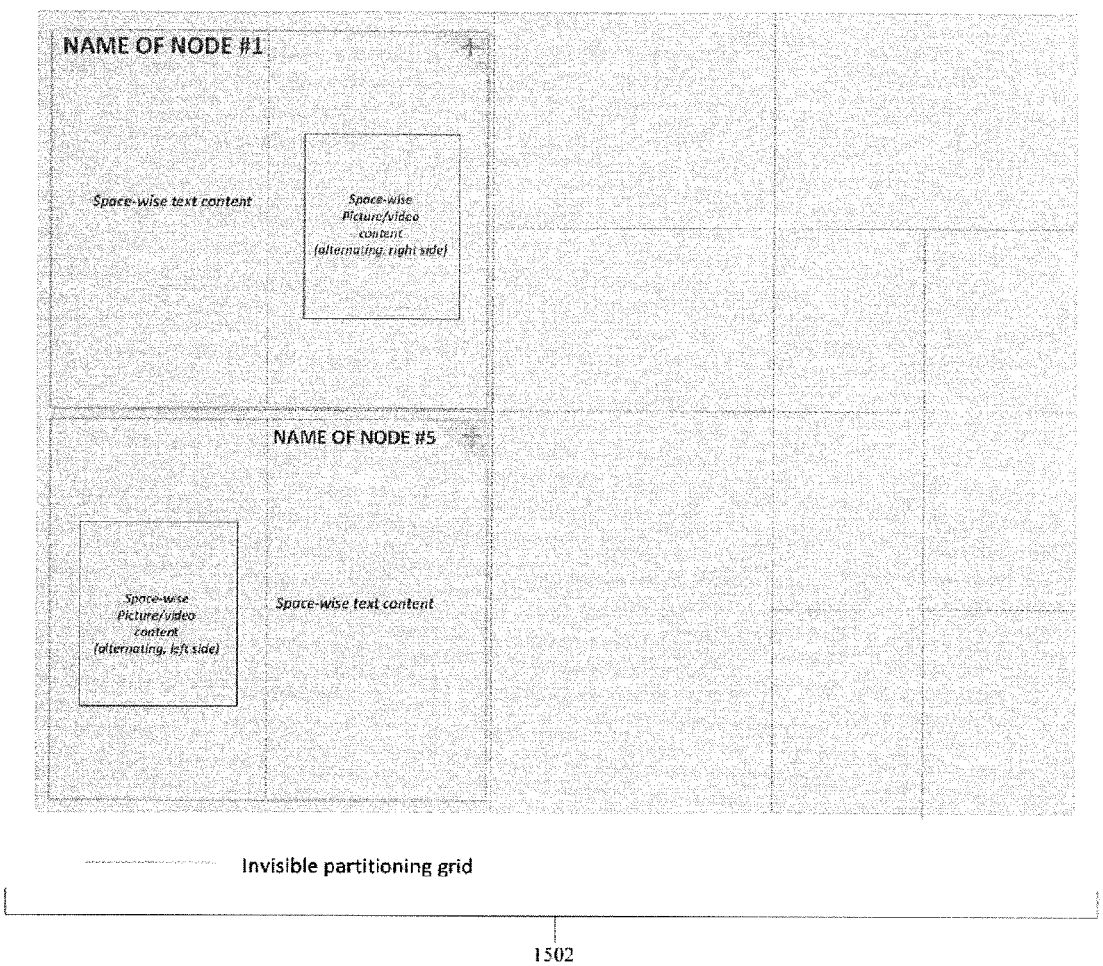
Fig. 15 Partitioning following an invisible grid

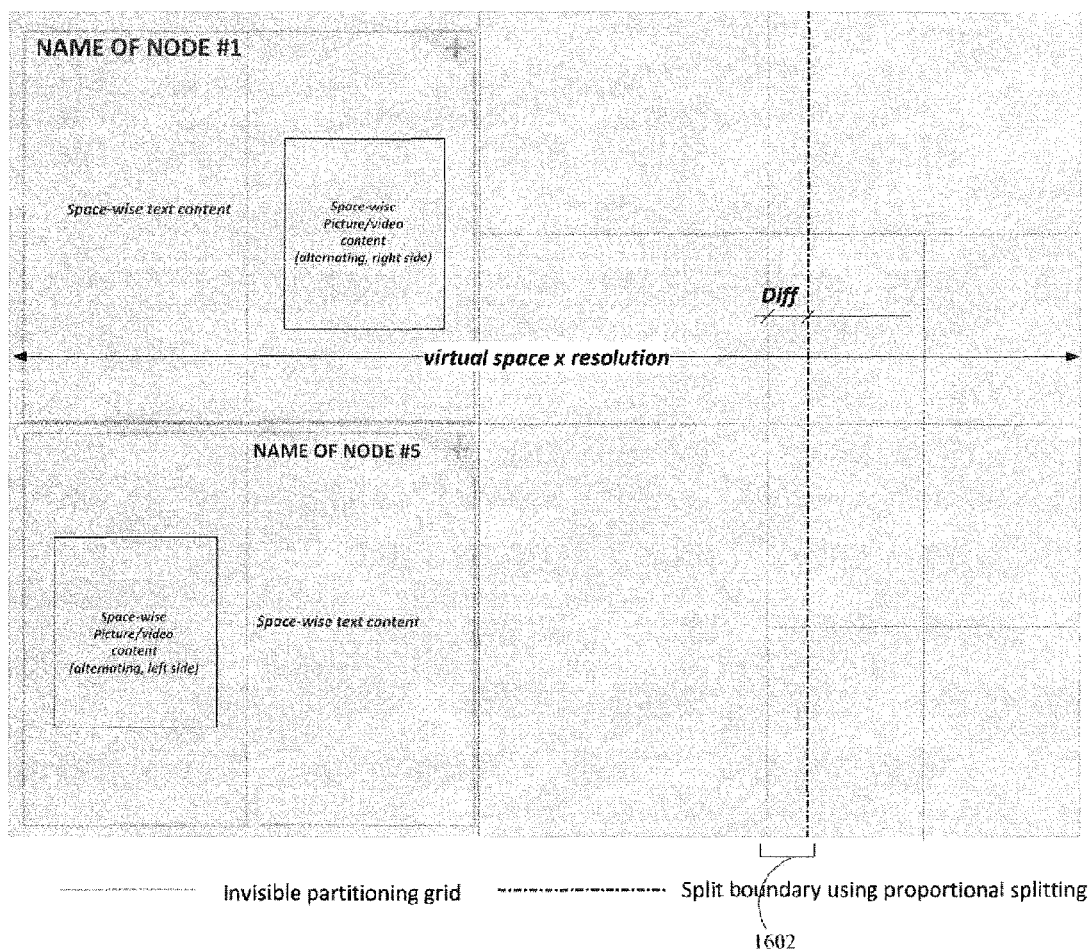
Fig. 16 Partitioning with breaking the proportions

Fig. 17 Enhancing grid resolution for partitioning
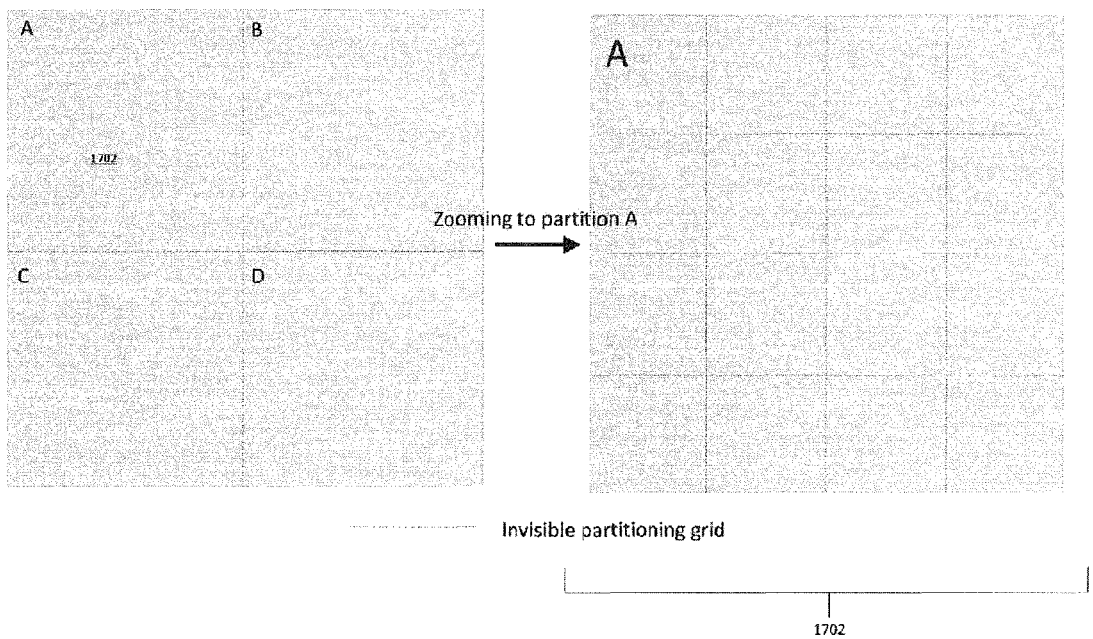

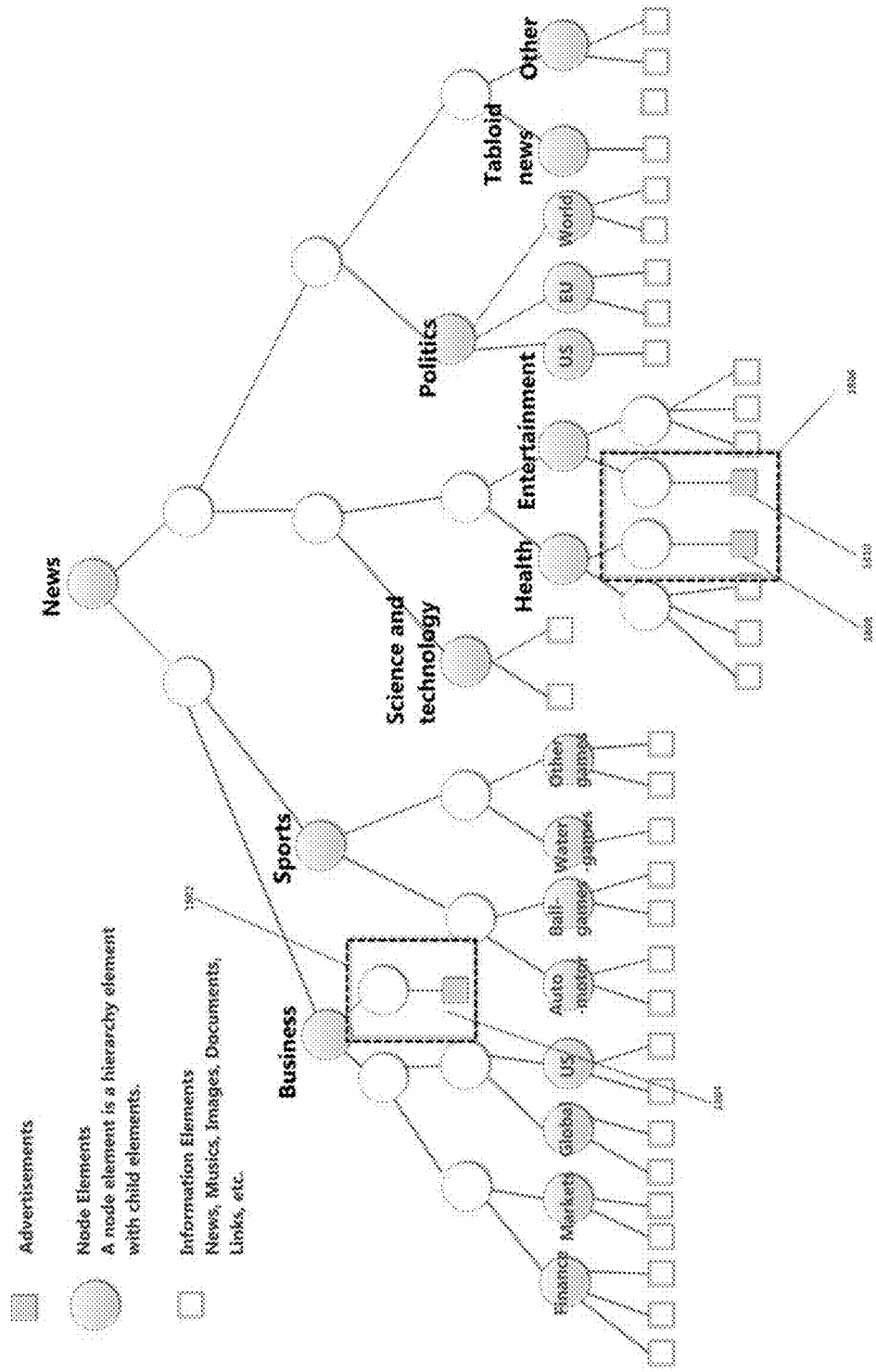

Fig. 19 Exemplar visualization and navigation on television
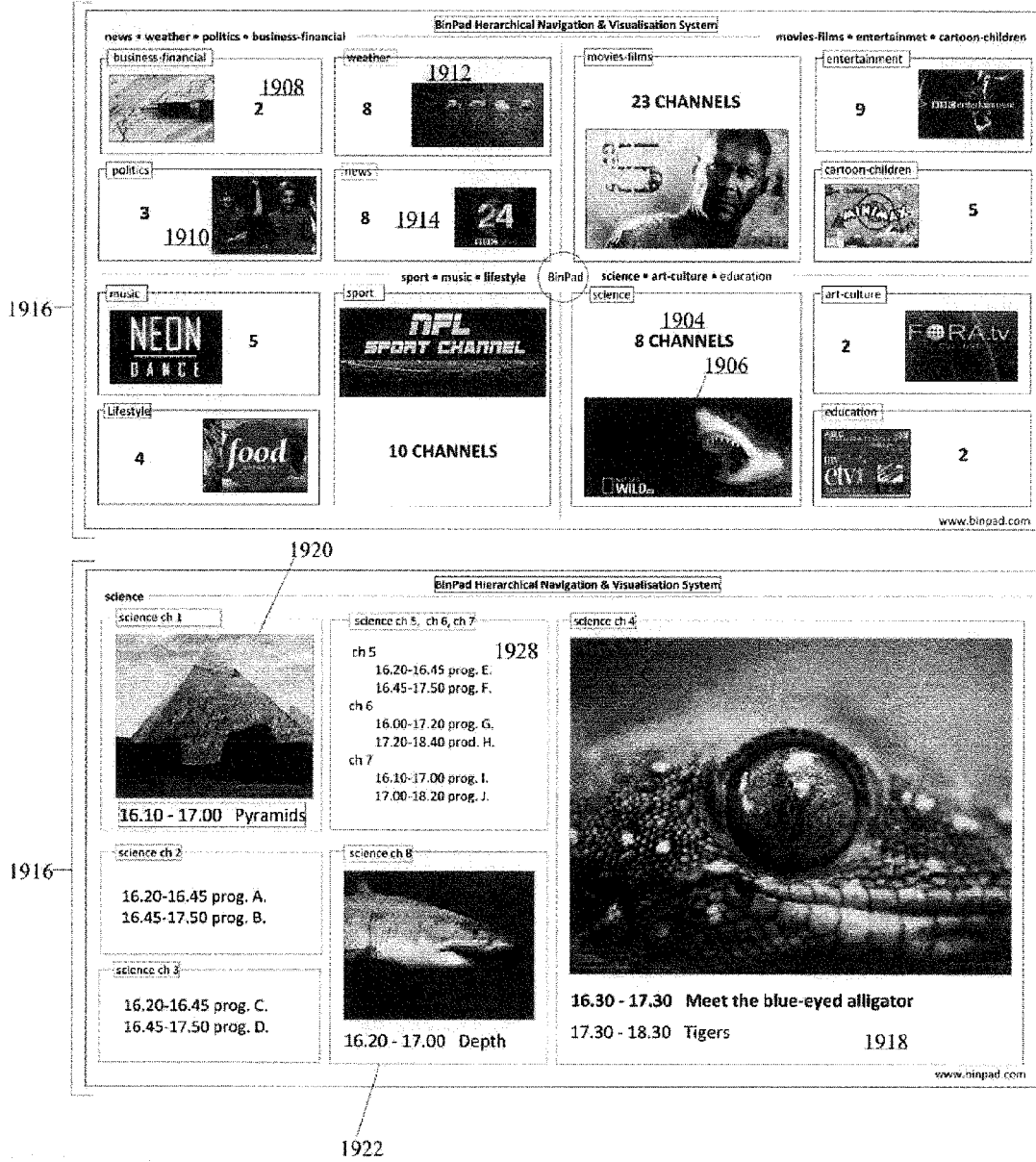

Fig. 20 Exemplar of Visualization news

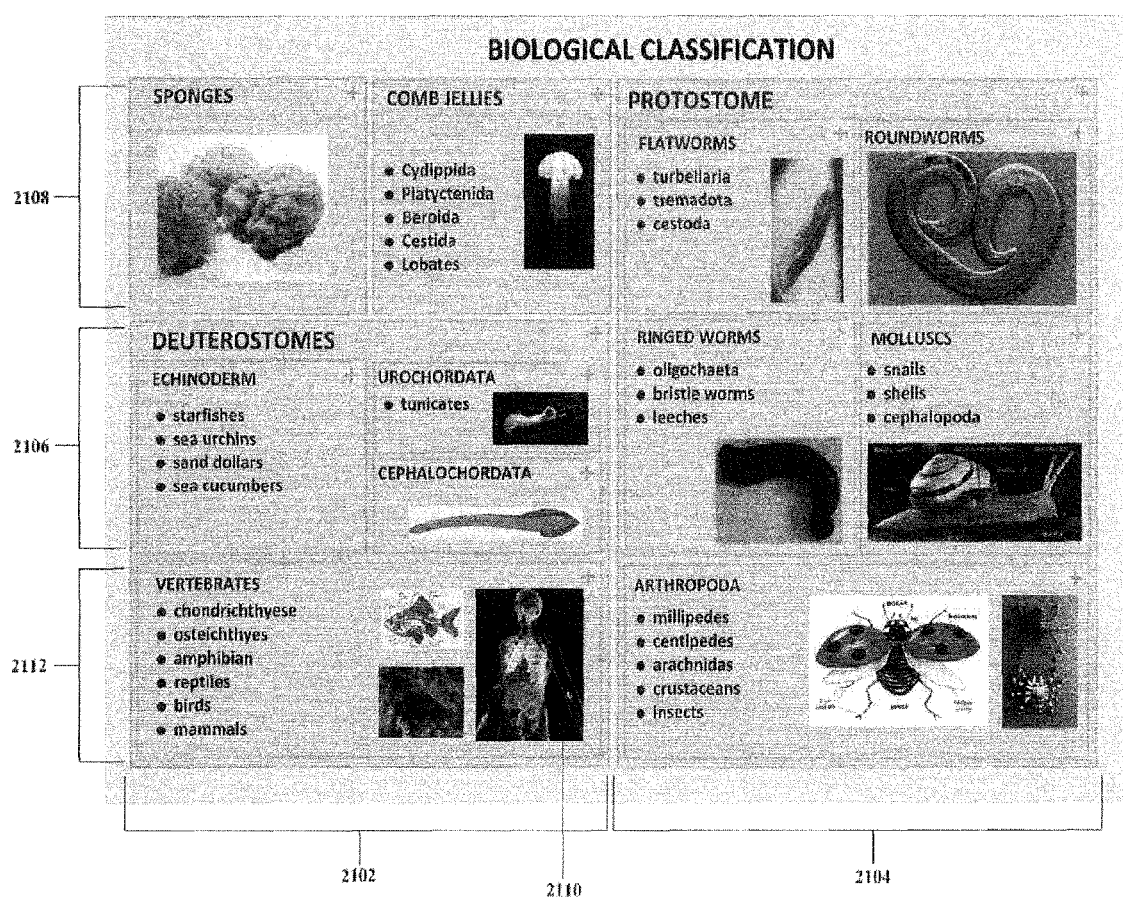
Fig. 21 BinPad in education

HIERARCHICAL NAVIGATION AND VISUALIZATION SYSTEM

COPYRIGHT

Copyright—A portion of the disclosure of this document contains material that is subject to copyright protection. The copyright owner has no objection to the facsimile reproduction by anyone of the patent document or the patent disclosure, as it appears in publically available Patent and Trademark Office patent files or records, but otherwise reserves all copyright rights whatsoever. The following notice applies to the software, data, and/or screenshots which may be described below and in the drawings that form a part of this document: Copyright Xdroid Kft. All Rights Reserved.

FIELD OF THE INVENTION

The present invention relates generally to the field of information management and computer-based visualization.

BACKGROUND

Many things in the world are hierarchical. For example, for most people the globe is an entity with a natural hierarchy, it comprises oceans and continents, continents consist of countries and we can further divide countries into smaller geographical areas, such as counties, towns, etc. When it comes to the visualization of information, there is always an optimal amount of information which most people find ideal at any given moment—not too much, nor too little.

Because most information is stored in computer systems, efforts have been made to process and visualize hierarchical information on these systems. Earlier systems developed tree-map visualizations and addressed mostly space-filing issues which were initially published by Brian Johnson and Ben Schneiderman in Johnson et. al., Tree-maps: A Space-Filling Approach the Visualization of Hierarchical Information Structures, Dept. of Computer Science & Human-Interaction Laboratory (University of Maryland June 1991). Tree-map visualizations become popular and provided better visualization when compared to traditional non-dynamic methods of displaying hierarchically structured data.

In tree-map visualizations, information is hierarchically structured. In conventional methods, trees are displayed using tree views. Because display space is limited, a decision must be made to show either the top of the tree alone or only show the expansion of certain chosen branches. This is because showing the entire tree expanded to its leaf-nodes would confuse people, not to mention take up excessive display space.

This space issue was partially addressed in classical tree-map visualizations where parts of the hierarchy containing more important elements were allocated more space while other portions that were less important were packed into a smaller display area. The display space is given by the user so the number and size of each node which is represented by a rectangular bounding box relies solely on the number the elements in the branches below the parent element.

This conventional method also became unusable, for example, when dealing with larger datasets. As computer technology advanced, many methods were developed to strengthen the usability of tree-map views. A method exists which aims to prioritize the elements of the hierarchy so the tree map visualization is based on a priority pattern which enables users to focus on more relevant topics. Treemap-like algorithms have significant disadvantages: for one, they use existing hierarchical information-structure and associate non-dynamic space-partitions with that structure. In other words the structure is given, rigid, and the treemap algorithms make attempts to display elements in an appropriate way. Moreover, users who employ systems using such algorithms must have a strong technical background to feed them with input data. Therefore, these systems are not accessible for everyday, non-technical individuals. There is a need for a system which simplifies the process of hierarchy building and display to the degree necessary to permit non-technical users to create and manage complex hierarchies.

On the information organization side, tree or hierarchy builder tools exist, but they are significant limitations on the types of hierarchies that can be created using those systems. For this reason, these tools lack usability and/or they have limited applications. One example is a family tree builder, which is good for building a family tree but is not ideal for something else. This and other tree building/presentation tools permit only simple hierarchies of a non-flexible nature. These presentation tools provide easy-to-use methods for information organization and visualization, but they are too universal and are not equipped for handling the special needs of handling multi-layered hierarchies. As a result, with these types of systems, special programming skills or technical expertise is required to create more sophisticated presentations/hierarchies. Moreover, users usually have some difficulty making hierarchies because it is hard for humans to split elements logically into more than two parts, but they find it easy when it simplifies to a decision on two parts. It's as easy for people as making a decision on which one of the two elements they prefer. Traditional tools don't give a helping hand in this matter.

In sum, methods and systems for organizing and visualizing hierarchies lack dynamism, usability, navigability, customizability, and interactivity that fulfill today's needs let alone human ergonomic and visualization aspects of interacting with computers.

From the discussion above, it should be apparent that there is a need for a system and method:
(a) which creates hierarchies from top-down and visualizes the structured information in a bottom-up manner, dynamically.
(b) to visually organize elements into a hierarchical structure using simple, iterating steps.
(c) which enables the creation of visually grouped sets of information.
(d) which comprises a visualization engine for mapping a hierarchically structured data to a virtual visualization space resulting in a nested structure preserving mapping of hierarchically structured data whereby elements which are closer to each other in the hierarchy are positioned closer to each other in the virtual visualization space.
(e) whereby elements and branches of the hierarchical structure are mapped to zoomable and compact partitions of the virtual visualization space, and can be displayed on various devices.
(f) which provides special visualization for better user-experience.
(g) which imports and functions with existing, pre-defined hierarchies.
(h) A system and method which renders the finished content into dynamic or static webpages, animated videos, sharing, direct Youtube upload, etc.

SUMMARY

Below is a simplified presentation of the disclosure for the purpose of providing a basic summary to the reader. This summary is not an extensive overview of the disclosure and it does not identify key/critical elements of the invention or delineate the scope of the invention. The purpose of this summary is to provide a simplified version of the concepts disclosed herein as an introduction to the below detailed description.

One aspect of the disclosed system, whose details are described here and further in the detailed description (also called the "system") is to provide a platform for creating, organizing, and visualizing hierarchical information comprising at least an editor and preferably coupled with a visualization engine. Another aspect of the invention is to provide such a platform that is easy to use, accessible to non-technical users, and operable through an intuitive user interface. Another aspect of the invention is to provide such a platform that permits users to create complex hierarchies with a high degree of customizability. Yet another aspect of the invention is to provide a hierarchical editor and visualization engine that may operate independently of each other and function with existing hierarchies.

One or more of the above aspects may be realized through systems and methods for a hierarchical editor and visualization engine. The system comprises at least a specially programmed computing device including least computer readable media comprising program instructions for implementing the methods described and an operating system. The system's editor comprises tools which assist the user in building a hierarchy. The preferred tools and functionality of the system are disclosed in the detailed description. In one embodiment, a computer implemented system and method is provided for an editor which enables a user to create a special hierarchical structure which is visually grouped into levels by so-called covering sets. Organizing the hierarchy is preferably top-down, with content added at each level by the user. Content added by the user is stored by the computer system ultimately for execution and display on a display device. Preferred methods for the editor include splitting and zooming functions whereby hierarchical structure is visually grouped into nested levels of covering sets. The splitting is done by iterating elementary (binarization) steps. The binarization step splits a quadrangular-shaped space-partition into two parts and associates content with the parts. The zooming permits a user to refine each partition to unlimited depth by drilling down to new level.

Additional functions of the editor are envisioned and discussed in the detailed description. For example, users may preferably push down chosen partitions, delete partitions with all of their sub-partitions, or raise sub-partitions up upon deletion.

One advantage of the editor is that it simplifies the user's complex task of mentally creating hierarchical structures by reducing the user's thought task to one single step at a time. For example, in the editor, users are presented with the option to split a partition in two parts. This feature is present because users usually have difficulty making hierarchies because it is hard for humans to split elements logically into more than two parts, but they find it easy when it simplifies to a decision on two parts. It is as easy for people as making a decision on which one of the two elements they prefer. Traditional tools do not aid users in this manner. In other words, the editor decomposes nonlinear information placement to local linear (binarization) steps.

The visualization engine (referred to also as the "engine") may work with or independently from the editor. The visualization engine renders the hierarchical content into the visualization space, displaying well-zoomable, quadrangular-shaped, compact space-partitions. If the visualization space is bigger than the display area, a windowing technique is used. In this case the user sees only part of the visualization space at one time. The rendering is a nested structure preserving mapping of hierarchically organized data therefore elements which are closer to each other in the hierarchy are positioned closer to each other in the virtual visualization space. Users might navigate in the virtual visualization space by either moving up, down, left, right or by zooming in/out partitions. The partition represents an aggregation of underlying sets of information. Zooming in a partition results in a refined resolution of the sets of information, by revealing a new covering set.

The information that the partition displays can be dynamically controlled. The engine may split space-partitions into two equal parts during binarization. In this case, the size of the created partitions is well-calculable and has a more balanced structure. In one embodiment, the binarization splits partitions using alternate directions (for example, first split horizontally, second split vertically, third split horizontally, etc.). Those skilled in the art will recognize this provides extra advantages, such as deterministic directions that are beneficial should the user control navigation through the system, both visually, and during editing, by voice commands, such as up, down, left, right.

The visualization engine also works with existing hierarchies created apart from the editor. When a hierarchy is non-binary, the editor can binarize it during import.

The editor may also generate animations by defining traversal paths. The traversal path is a defined route over the hierarchically organized information elements, which enables a virtual tour in the hierarchy. Using traversal paths users may walk through a desired route like a presentation. The user may define many traversal paths and save the virtual tour as a video-animation to share in various formats (standard video, Youtube export, etc.)

Some practical applications of the system include, but are not limited to, the following:
 a) Education (biology, history, geography, etc.). For example, educators who need assistance breaking down a complex lesson in to components that may be easily digested by students. Students meet not only the lexical content but they also spend time with the structure of a given subject which is very important for understanding concepts.
 b) Demonstration and introduction (company brochures, webpages, business cards, CVs, menucards, etc.).
 c) Visualization of dynamic, real-time content (TV channels, news, weather, realtime feeds from information systems).

BRIEF DESCRIPTION OF THE DRAWINGS

FIG. 2 shows an embodiment of the editor's initial screen.

FIG. 3A is a view of an embodiment whereby hierarchies are built using the editor.

FIG. 3B shows an exemplar hierarchy structure with the editor.

FIG. 4 illustrates the selecting of space partitions.

FIG. 7A shows an exemplar structure of the system in a structural view.

FIG. 7B shows an exemplar structure of the system in a hierarchy view.

FIG. 8 shows the preferred embodiment of an engine for displaying a hierarchy.

FIG. 9A illustrates a method for importing an existing hierarchy into the editor.

FIG. 9B illustrates a method for importing an existing hierarchy into the editor.

FIG. 11A shows an exemplar binarized hierarchy tree.

FIG. 12 shows simplified visualization.

FIG. 14 shows virtual space and display area.

FIG. 15 shows partitioning following an invisible grid.

FIG. 16 shows partitioning with breaking the proportions.

FIG. 17 shows enhancing grid resolution for partitioning.

FIG. 18 illustrates inserting thematic advertisements

FIG. 19 shows exemplar visualization and navigation on television.

FIG. 20 shows exemplar of visualizing news.

FIG. 21 shows the system used in education.

DETAILED DESCRIPTION

Figure 1:
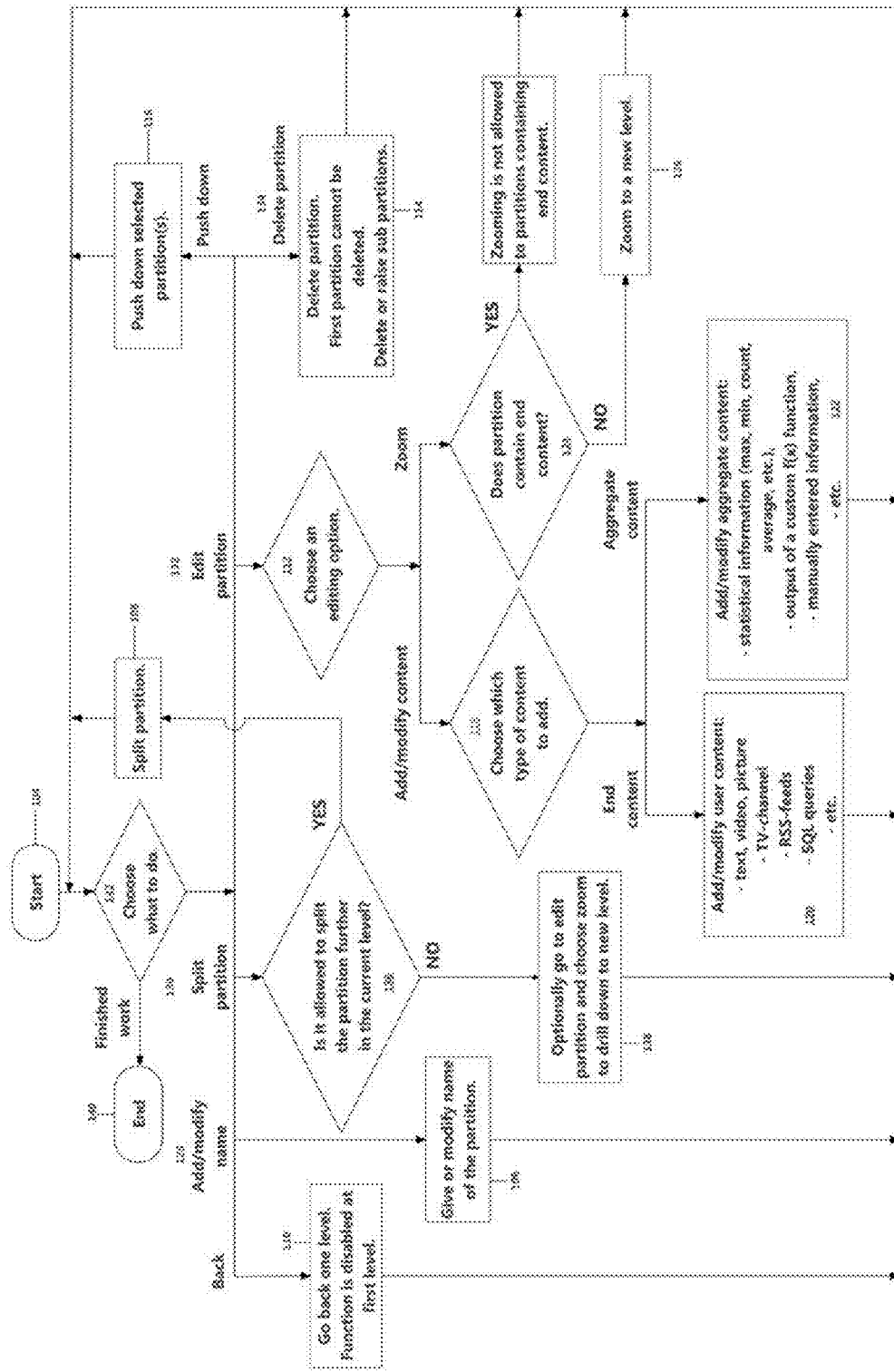
FIG. 1 shows major functions of the preferred embodiment of the editor

Disclosed is a method and system for visually placing information in a hierarchical structure. The system defines a unique method and system for organizing and visualizing hierarchical information. The system preferably comprises a visualization engine and an editor.

The following detailed description of embodiments refers to the accompanying drawings, which show only an example of embodiments of the invention. Those skilled in the art will recognize variations in the look and design of the system disclosed do not depart from the scope of the invention. At least one embodiment of the invention may be implemented in the form of a computer product including a computer usable medium with computer usable program code for performing the method steps indicated. At least one embodiment of the invention can be implemented in the form of a system including a memory and at least one processor that is coupled to the memory and operative to perform the exemplary method steps. The actual display on which it operates is also not restricted, it applies to any appropriate display; for example it varies from mobile devices through laptops and interactive tablets to larger television or projected screens.

Below is a (1) Glossary of Terms followed by (2) a discussion of the System and its associated processes and (3) the System Architecture.

1. GLOSSARY OF TERMS

Display: A physical area (screen, projected hologram, etc.) created by a device that the users actually see. Users might see all or just a part of the virtual visualization space on a given display.

Hierarchically structured data: A data structure which is organized in a tree-structure, each element may have zero or more children elements and each element has exactly one parent, except for the root. Root node is the starting node, inner nodes or parent nodes have at least one child node, leaf nodes have no child node. Sibling nodes are linked to the same parent nodes. The hierarchically structured data might be also referred to as "hierarchy", "hierarchy tree", "tree structure" or simply "tree".

Information elements: User content that is connected to a node in the hierarchy. Information can be user content, e.g. text, pictures, videos, hyperlinks, TV channels, ads, etc. In the system, information elements are connected only to leaf nodes.

Binary hierarchy: A hierarchy where each parent has maximum two children nodes.

System binary hierarchy: A binary hierarchy where information elements connect only to leaf nodes.

Binarization: A method of making binary hierarchy from any hierarchy. The binarization method is a transformation which ensures that each parent in the hierarchy will have a maximum of two connected children.

Halving splitting: A special splitting of the space partition, where the two created partitions will have equal size, thus providing standardized, easy calculable partition sizes and better thematic placement.

Alternate splitting: Alternate splitting directions during partitioning (first split horizontally, second split vertically, third split horizontally, etc.). This provides nice placement and better user experience.

Covering set: Define T as a binary tree. Define inner nodes of the binary tree as $p_1, \ldots p_k$, while leaf nodes as $c_1, \ldots c_m$. Define a set of inner nodes as Innernode(T):=$\{p_1, \ldots p_k\}$ and also define a set of leaf nodes as Leafnode(T):= $\{c_1, \ldots, c_m\}$. If we define total nodes of T as Vert(T), then Vert(T)=InnerNode(T) union LeafNode(T). It is also true that T has k+m nodes in total. Now define the following covering relation between nodes: Define v as an element in Vert(T), define w as an element in LeafNode(T). We can say that v covers w if it is able to reach v from w using repeating sequence of parent selection. Given $V_0=\{v_1, \ldots v_s\}$ as a subset of nodes of T. $V_0$ is a covering set if and only if all $l_i$ in LeafNode(T) is covered by one and only one element in $V_0$. In other words, a covering set is a non-redundant partitioning of leaf nodes.

Sub-tree: Represents all nodes and elements that can be reached using repeating sequence of children selected from a given node.

Level: A covering set which forms at least one coherent space partition in the screen.

Visualization settings: Settings that affect the system's behavior to leverage ease of use and user experience.

Virtual visualization space: A two-dimensional plain space where the hierarchical structure is visualized.

1. The System

The system is a unique method and system for creating, organizing, and visualizing hierarchical information. The system comprises at least the visualization engine and the editor, although the editor and engine may operate independently of each other.

The following methods and techniques are detailed below:
  a) The building of a visually partitioned, multi-leveled hierarchy by iterating simple splitting and zooming steps.
  b) Modifying the hierarchy and the contents.

c) Rendering the hierarchical content into a visualization space.
d) Controlling the type and the amount of information which is displayed.
e) Enhancing visualization using special techniques and rules.
f) Providing navigation possibilities for walking through the hierarchy.

The Editor

Despite the fact that most of the elements of our world are hierarchical, people tend to learn and think in a linear way. The editor helps the creative nonlinear thinking by letting the user visually build and manage a hierarchy in simple steps. The method of organizing the hierarchy is top-down, performed by systematically iterating elementary (binarization) steps. Visually building a hierarchy is preferably done with the editor, a computer program product embodied on a non-transitory computer readable medium coupled with at least one processor, memory, a display device, and an input device (such as a keyboard or touchscreen) for performing the operations of the editor as described herein. The system architecture is described more fully later herein.

FIG. 1 is a diagram of a process for creating and editing a hierarchy using the system's editor.

To start, the editor creates a single root node 104. In the user's display device screen, a single, rectangular area is shown. The system permits a user to add/modify name 128. Using name function the user may give name or modify the name of any partition 106.

Splitting 108:
The preferred method of splitting a partition is as follows:
1. A user splits the selected partition either vertically or horizontally, which severs the partition into two parts.
2. Define v as the node associated with the partition to be split. The system inserts two children nodes ($c_1$ and $c_2$) to v in the hierarchy. The system links $c_1$ as left child of v and link $c_2$ as right child of v. The left child is associated with the left or top space partition, while the right child is associated with the right or bottom space partition, depending on the direction of the split.
3. The system stores the direction (horizontal or vertical) and the proportion (e.g. 30%) of the splitting as a node attribute of v. The system also changes covering set from n to $c_1$ and $c_2$.

Additional functions of the preferred editor are also shown, such as a Back function 110, an option to edit a partition 112, a function to delete a partition 114, and push down a partition 116. A method for editing the content comprises adding content 118 which may be either end content, such as content which is no longer capable of or appropriate for further splitting 120 or content which is capable of further split 122, in which case, the user returns to Start 104 with further options for editing, such as naming the partition 106, splitting the partition 108, editing the partition 112, or deleting the partition 114. The edit partition function 112 may also give the user the option to navigate through non-end content 124 by zooming to new levels 126. When faced with a new partition (either at the very beginning or if the user has created a new partition), the system is preferably configured to permit users to continue to choose editing options such as editing/modifying names/titles 128, splitting the partition 130, editing a partition 132, deleting a partition 134 and navigating down partitions 116.

As a whole, FIG. 1 shows the preferred process for editing using the editor. Throughout this disclosure, the manner in which this process may be implemented by the system is discussed in detail.

In FIG. 2, an embodiment of the system is shown, displaying the root node as a single, rectangular-shaped partition numbered as "1" is shown 202. "Level 1" states the level of covering sets which is currently displayed.

In this exemplar embodiment the user splits the area by touching one of the "slice" button, either vertically 204 or horizontally 206. The slicer on FIG. 2 may be adjustable, user may split the partition evenly or unevenly. Performing an even, halving split results in easier calculable partition sizes. The halving split has several advantages:
  The size of the area which will be associated with the nodes will depend on the depth of the tree
  The created partitions are easily addressable based on only directions (up, down, left, right)
  Better for placing special user content, for example space for advertisements may be calculated easier and placed thematically.

The user may perform alternate splitting. This means that if the partition was split horizontally, the created two sub-partition must be split vertically and vice versa. Alternate splitting has several advantages. If the partition doesn't have name, the navigation might established by up/down/left/right directions that refers to relative partitions. The created sub-partitions have well-adjustable size enabling a category-based placement. A visualization setting is available that enforces alternate splitting.

By iterating the binarization step, user divides the space into sub-partitions and creates the first layer of partitions in other words the first covering set. The covering set visually "covers" the underlying information set and comprises partitions that are displayed together. FIG. 3A shows a possible partitioning into 5 parts numbered from 1 to 5. The numbering is automatic; it helps to identify elements and also helps to plan navigation routes between elements later.

In the visualization settings, a user may set the size of the smallest possible partition or a limit can be set as to the maximal number of splitting at a given level. If these limits are reached for a particular partition, the partition cannot be split further. In the example embodiment in FIG. 3A, partitions 3 and 4 are the smallest possible partitions. The size of the virtual space and the maximal number of splitting at a level might vary depending on many factors such as display device type or other settings, for instance, display size.

Note that with visual partitioning, the user actually builds a binarized hierarchy. The hierarchical structure of the visualized space partitions 322 in FIG. 3A is shown in FIG. 3B. The "Level 1", which is the actual covering set is marked with black squares, for example 312. The elements of the covering set (numbered from 1 to 5) (312, 314, 316, 318, 320) can be seen on the display at "Level 1".

Inserting Partitions

A partition may be inserted with reference to another partition. The editor is preferably configured to permit the user to insert another partition by splitting the original partition or just inserting. Either the partition splits, therefore giving space for the newly inserted partition, or, the inserted partition takes over the entire space of the other. The former is useful when the earlier partition contains user content, the latter is used when an earlier partition does not have content.

One embodiment for inserting a partition with a split to an earlier partition is the following:
1. Define v as the node associated with the partition where new partition is to be inserted. Define p as parent of v.
2. Insert a new w node, re-link w as a child of p instead of v.

3. If partition needs to be inserted top or left, insert a new u node, link u as a left child of w. Link v as a right child of w.
4. If partition needs to be inserted bottom or right, insert a new u node, link u as a right child of w. Link v as a left child of w.

One embodiment for inserting a partition without a split is the following:
1. Define v as the node associated with the partition where new partition is to be inserted. Define p as parent of v.
2. Insert a new w node, re-link w as a child of p instead of v.
3. Delete node v.

Selecting Partitions

Splitting creates partitions associated with inner nodes. Users may select partitions represented by any inner node even if they were split further. This method also provides that an inner node selection comprises one or many covering set partitions which form a quadrangular shaped area. The selected area fits well to today's displays and is well zoomable. For example, in FIG. 4 user selects partition 3 401 and its adjacent partition 4 (together 404). Or, user may select partition 3, 4 and 5 (collectively 406).

Push Down

Push down means that the selected partition(s), together with any existing sub-partitions, will move one level deeper forming a new covering set.

The method which provides this mechanism is as follows:
1. Given p the root node of selected hierarchy tree. Set p as covering set node.

Delete

A user may delete partitions. Preferably, two types of deletion exist:
1. Delete current partition and all of its sub-partitions. As result, the deleted partition disappears and adjacent partitions will fill out the space according to their placement in the binary tree. This is described as delete method.
2. Delete current partition without deleting its underlying levels and partitions. The covering set of the underlying level will raise to the current level. This is described as a raise method.

A user deletes a selected partition in the editor preferably using a delete button and choosing "delete partition with all sub-partition". This may preferably be accomplished by the following method:
1. Given a selected partition and its associated v node element in the hierarchy.
2. If v has sibling node, link sibling node to grandparent node of v.
3. Delete node v, parent node of v and all of its descendants in the hierarchy and redisplay covering set.

For example, when partition number 3 301 is deleted in FIG. 3A, partition 4 302 will take over its place by doubling its original size. Or, by way of another example, if partition number 2 304 is deleted, partition 3 301, partition 4 302 and partition 5 306 will fill out the missing space by maintaining their original proportions and partition 1 308 remains unchanged because it is positioned in another branch of the hierarchy.

A user may also delete a current partition without deleting its underlying levels and partitions. The covering set of the underlying level will raise to the current level. It is allowed to raise sub-partitions when the result will meet requirements of visualization rules at the current level, for example, it will not exceed the number of maximal splitting or the size of sub-partitions will not drop below a threshold.

A user may raise sub-partitions of a selected partition in the editor using the delete button and chose "delete selected partition only." This function is preferably effected as follows:

Method of Raise:
1. Given a selected partition and its associated v node element in the hierarchy. Mark v as not a covering set element and delete its content. Redisplay covering set.

Move Partition

A partition might be moved from one place to another. In the underlying hierarchy, this is a replacement of the selected node and its descendants to another part of the hierarchy tree. Technically, it is a delete followed by an insert.

Edit and Zoom

When users split the partitions as they want, a selected partition can be switched to edit mode. In FIG. 3A, the edit button at the right top corner of the partitions (ex. 310) switch the partition to edit mode. In edit mode, the user can add or modify the information which is displayed in the partition. Basically there are two types of content exits: end content and aggregate content.

End Content

End content may be any type of user content (audio, video, picture, link, etc.) that will be linked as information elements to an actual node. When end content is added to any partition, the partition cannot be split further.

Aggregate Content

The system can display information from the partition's sub-partitions as well. Using the visualization rule settings, visualization behavior of each partition can be customized. During navigation, visible partitions shrink and grow as the user navigates through the hierarchy by zooming in and out. With visualization rules, it is possible to control each partition how they behave when their visible size varies. Several settings help visibility and maximize user experience. The visible content of a space-partition depends on its actual size; it may consist of one or the combination of the following elements:
  (a) A customized user content which is not end content.
  (b) An output of function f(x) where x represents the node associated with the displayed partition. Output can be one content (number, picture, video, text, link) or array of contents (A[content, index] pairs) where index is optionally used for ranking the contents in the array and display only the top when the displaying space is limited.
  (c) or combination of both An embodiment of this function may include, but is not limited to the following:
  (a) Statistical information about the end contents of the underlying partitions (for example: minimum, maximum, count, average of elements).
  (b) A textual list of the elements in sub-nodes or leaf-nodes sorted by date of creation.
  (c) List of contents on that users clicked most at a given period.
  (d) Personalized recommendations based on usage statistics.

Figure 5:
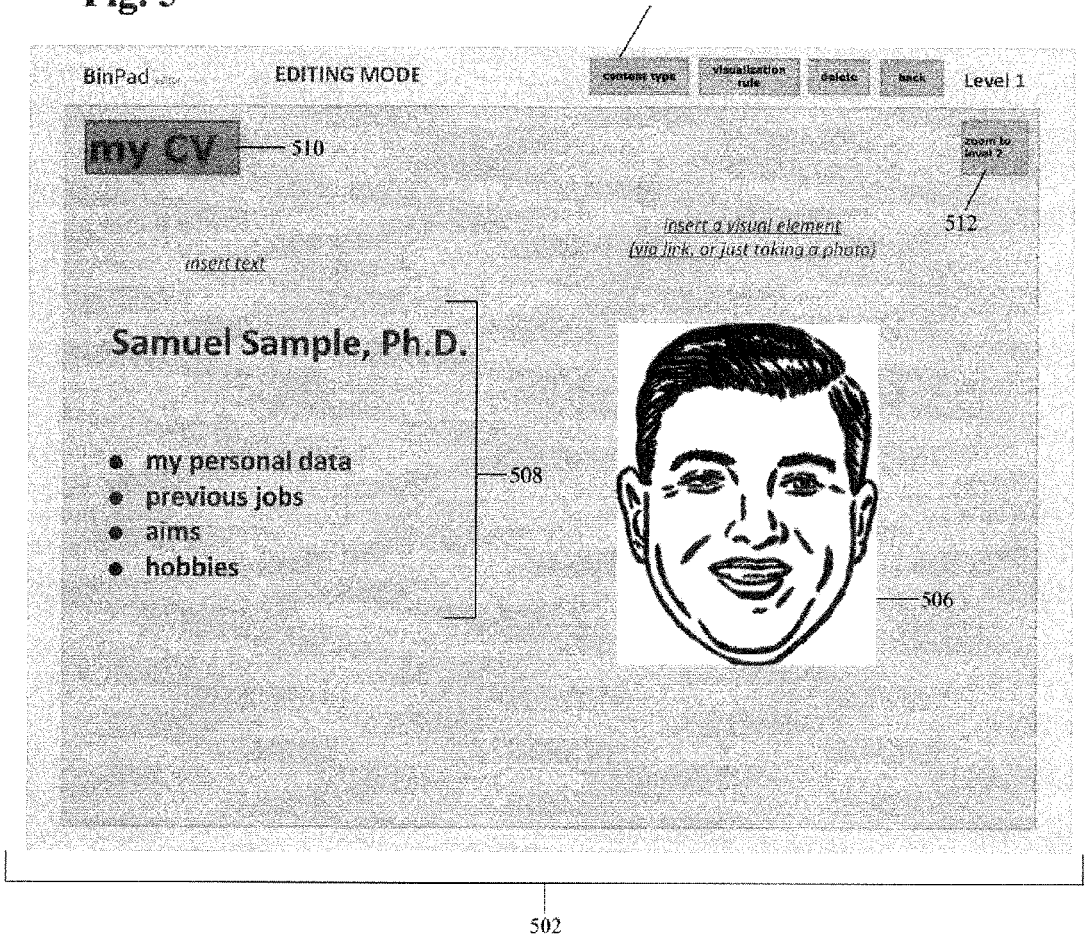
FIG. 5 is an exemplar view of the editing mode in the editor.

An example of a screen shot of an embodiment of the editor in editing mode can be seen on FIG. 5 502. A user may change the type of content using content type button 504. In this example adding a picture 506 and content 508 has created a partition named "My CV" 510.

If a partition needs to be further split but we reached the limit set by visualization rules, user may drill down to new level by using the "zoom to level x" button. Zooming to a new level, user may continue splitting and editing, resulting in a new covering set.

Figure 6:
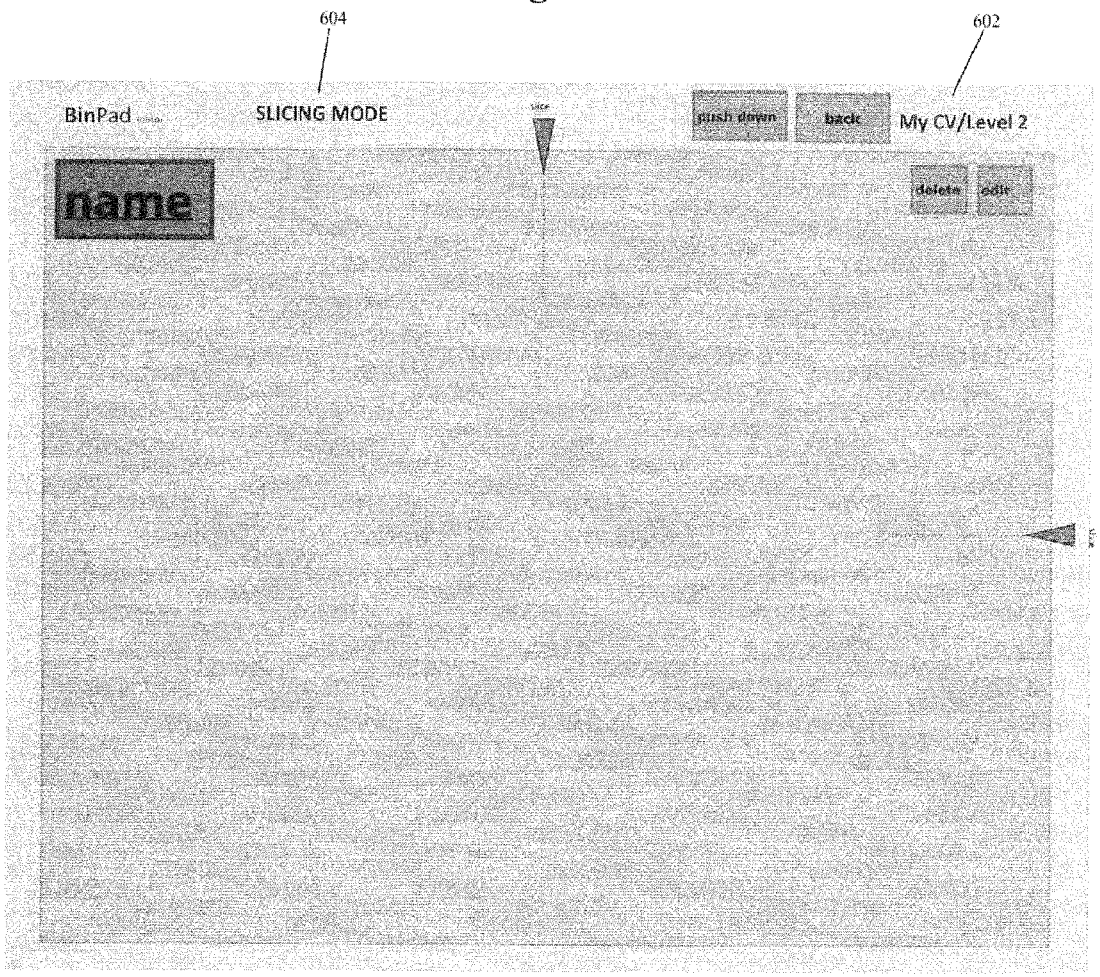
FIG. 6 shows an exemplar Level 2 slicing mode.

In the example when the user touches the "zoom level 2" button 512 the editor switches to "My CV/Level2" (FIG. 6) and starts with slicing. FIG. 6 shows the slicing screen at the example of MyCV/Level2. The editor preferably designates this mode, "Slicing mode" 604.

Building Covering Sets

The depth of the hierarchy is not restricted. FIG. 7A is an illustration of a hierarchical structure created with the editor. Note that each level has its own covering set and all levels except "Level 1" is nested to a parent partition on the upper level resulting in a nested hierarchy of covering sets. For example on FIG. 7A at "Level 1" A, B and C subpartitions 702 have children subpartitions at "Level 2" 704 (A/Level2 706, B/Level2 708 and C/Level2 710, respectively). The structure visually created in FIG. 7A 712 can be seen on FIG. 7B 714. We could say that the space-partitioning in splitting mode unequivocally defines the binary tree and vice versa.

The Visualization Engine

The system's method and visualization engine (the "engine" or "visualization engine") displays a covering set of a binary hierarchy using rectangle-shaped space partitions. The engine displays a covering set. The schematics of the engine can be seen in FIG. 8.

The method is the following:

Prerequisites: Given T as a system binary tree or sub-tree with a root node as starting node. Nodes in T are selected as covering-set nodes, they form a valid covering set.
1. Initialize an active set by selecting a root node and assign space partition to it 802. Determine whether any element in the active set is not an element of a covering set 820. If no, end, 804, and if yes, iterate the following steps from a. to f., exit 804 when each element in the active set are elements of a covering set:
    a. Select an arbitrary element of the active set which is not element of a covering set. Set space partition which is associated with the selected element active 806.
    b. Determine number of child element(s) of selected node element(s) as x 808.
    c. If x=1 go to point f. If x=2 split active partition either horizontally, or vertically 812. The decision can be made based on direct node attributes (vertical/horizontal split and proportions) or—without information—by performing alternate, halving splitting. Determine whether the slit is horizontal or vertical 818.
    d. if the partition was split vertically, assign partition on the left side to left child node and partition on the right side to the right child node 814.
    e. If the partition was split horizontally, assign partition on the top to left child node and partition on the bottom to the right child node 816.
    f. Replace selected element with its child/children node element(s) in the active set 810.

The visualization engine also works with existing hierarchies created apart from the editor given that the existing hierarchy is binarized and it contains nodes that form a valid covering set.

There is also an option to handle non-binary hierarchies by importing them into The system which binarizes it. The goal of the binarization is to ensure that a parent has maximum two children elements within a node, so if a parent has more than two children, the binarization makes two groups by inserting hidden node elements then divides the elements between the two groups. It is also possible that information elements are linked to a non-leaf node in the hierarchy. In the system, information elements must be linked to leaf node elements only, therefore during import, the system re-links those information elements which are linked to non-leaf nodes to a newly inserted leaf-node.

Figure 9C:
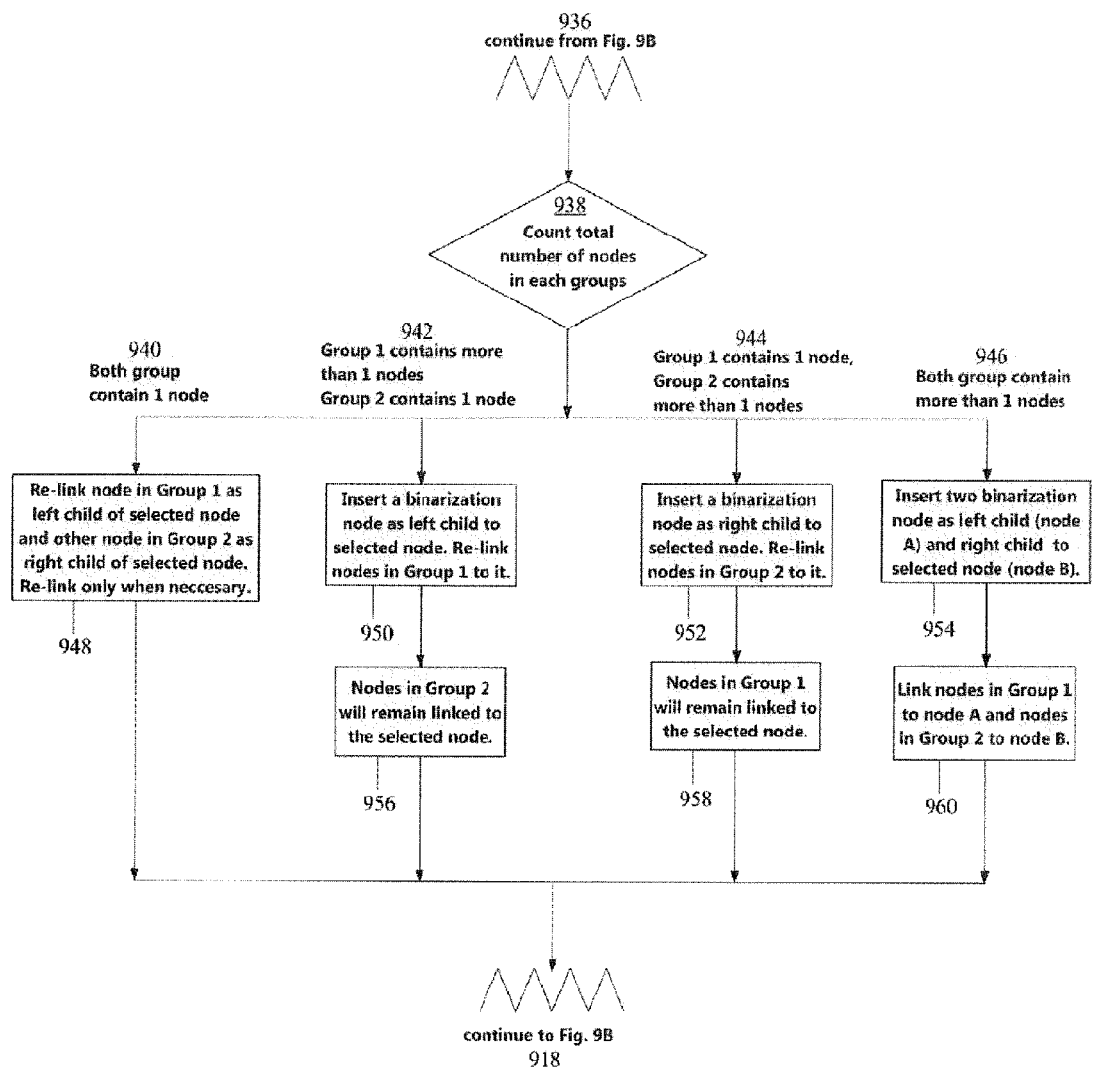
FIG. 9C illustrates a method for importing an existing hierarchy into the editor.

The preferred method of importing and binarizing is detailed in FIG. 9 A-C and is best understood with reference to the flow chart, which has been divided in 3 parts 9A-C for ease of viewing. At the start, first determine whether the count of root nodes is greater than 1. 902. If no, the root note is selected 906 and it is determined if it has child notes or information elements 908. If the note has both child nodes and information elements 912(*a*), then a new child node is inserted to the actual node. All information elements are relinked to the new child node and the selected node remains unchanged. 912 (then return to 908). If the selected node has only child node(s) 914*a*, then it is determined the number of child nodes of the current node, eg node X 914. If x=0, then there is nothing to do (leaf node element) 920. If x=1, then this is a node element with one child 922 and the process return to 918 where may end 920 if each node has been processed or continue 910. If X>1, determine whether there will be a new level 924, and if no, and the partition cannot be split 926, then zoom to a partition first 928, returning to 924. If yes at 924, yes, zoom to a partition 930, split partition 932, organize the child nodes into two groups having at least one node in each group 934, assign the groups to partitions 936, count the total nodes in each group and proceed as follows:
    1. If both groups contain 1 node 940, relink node in Group 1 as a left child of selected node and other node in group 2 as a right child of selected node 948.
    2. If group 1 contains 0.1 node and Group 2 contains 1 node 942, insert a binarization node as left child to the selected node. Relink nodes in Group 1 to it 950. Node in group 2 will remain linked to the selected node 956.
    3. If Group 1 contains 1 node and Group 2 contains >1 node, insert a binarization node as right child to selected node. Relink nodes in Group 2 to it 952. Nodes in Group 1 will remain linked to the selected node 958.
    4. If both groups contain >1 node, insert two binarization nodes as left child (node A) and right child to selected node (node B) 954. Link node in Group 1 to node A and nodes in Group 2 to node B.

At the end of sub-processes 1-4 here, the process continues at point 918, where if each node has been processed 918, the process ends 920, and if not, continues at point 910.

Figure 10:
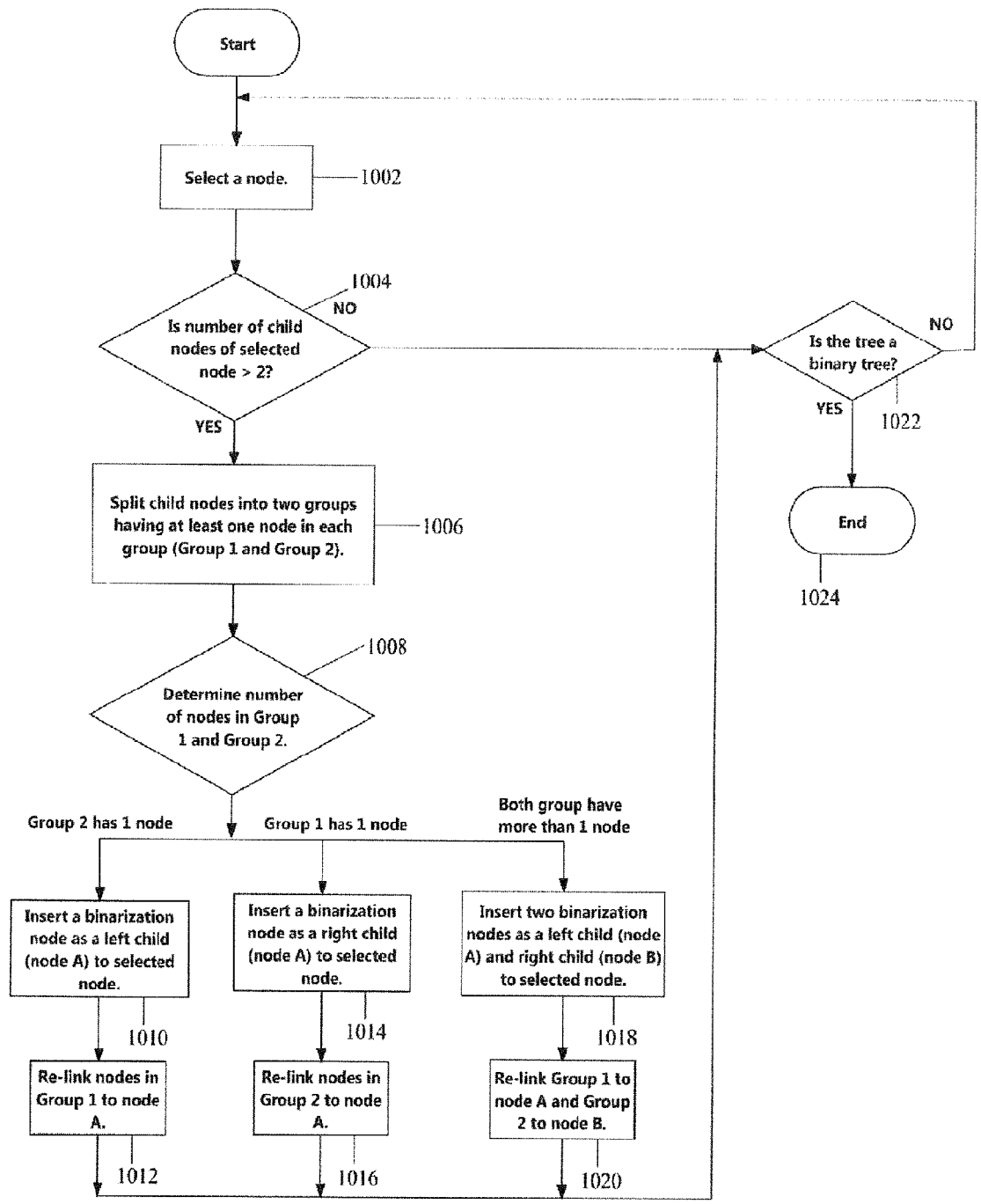
FIG. 10 shows the method of binarization.

A method which is independent from the editor is also provided to binarize non-binary hierarchies as illustrated in FIG. 10. The method is as follows:
1. Iterate steps from a. to f., exit when the whole tree is a binary tree.
    a. Select an arbitrary node (n) 1002.
    b. Determine whether the number of children nodes of selected nodes >2 902? If yes, continue. If no, go point a.
    c. Split children nodes in two groups, Group 1 and Group 2, having at least one node in each group 1006.
    d. Determine the number of nodes in Group 1 and Group 2 1008.
        i. If Group 2 has one node, then insert one binarization node ($c_1$) link $c_1$ as a left child of n 1010. Re-link nodes in Group 1 to $c_1$ 1012.

ii. If Group 1 has one node, then insert one binarization node ($c_2$) link $c_2$ as a right child of n. 1014. Re-link nodes in Group 2 to $c_2$. 1016.

iii. If both Group 1 and Group 2 have more than one node, insert two binarization nodes ($c_1$ and $c_2$) link $c_1$ as a left child and $c_2$ as a right child of n. 1018. Re-link nodes in Group 1 to $c_1$ and Group 2 to $C_2$. 1020.

When subprocess steps i-iii above are complete, determine whether the tree is a binary tree 1022. If not, the process continues at point 1002, if yes, the process ends 1024.

Possible Effects of Binarization

Figure 11B:
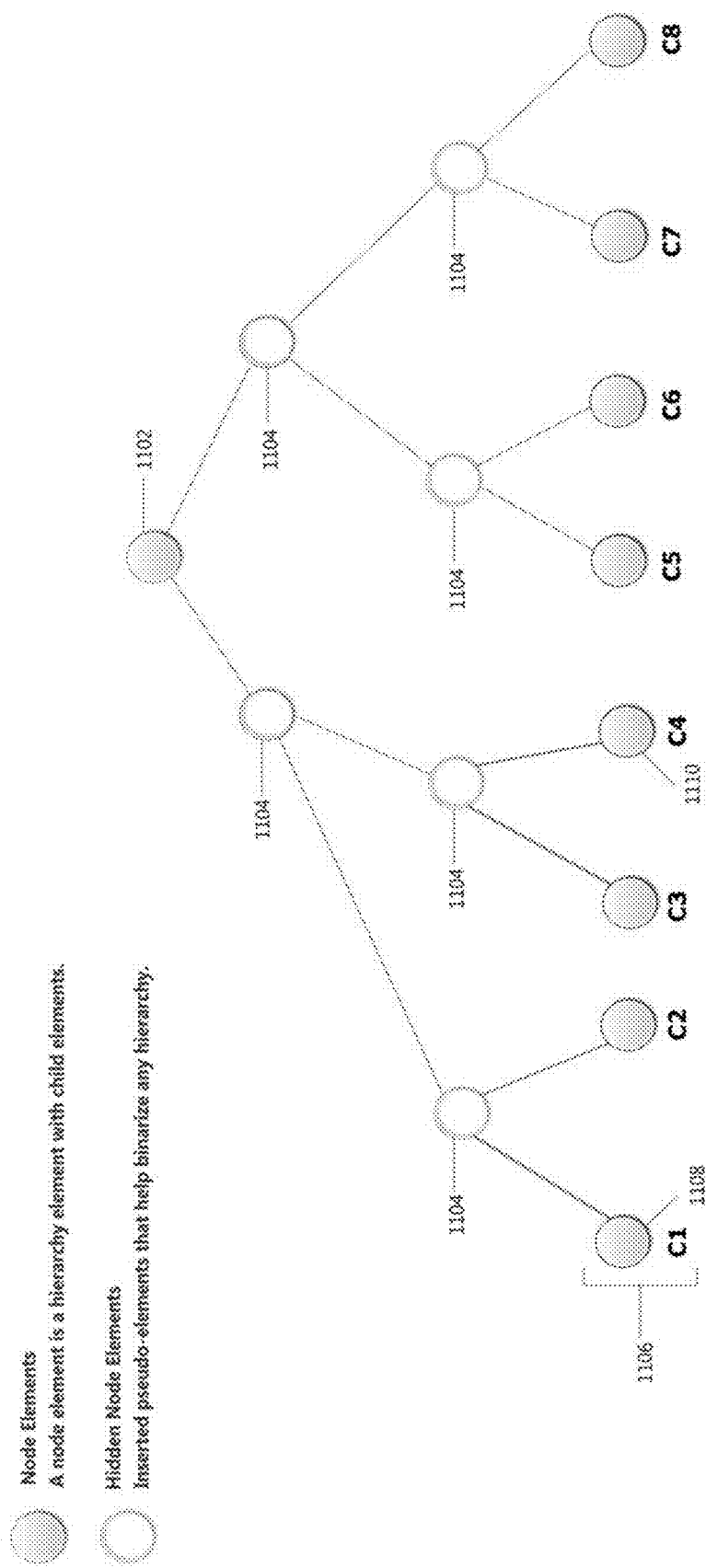
FIG. 11B shows an exemplar equal split in an exemplar 4-level hierarchy.
Figure 11C:
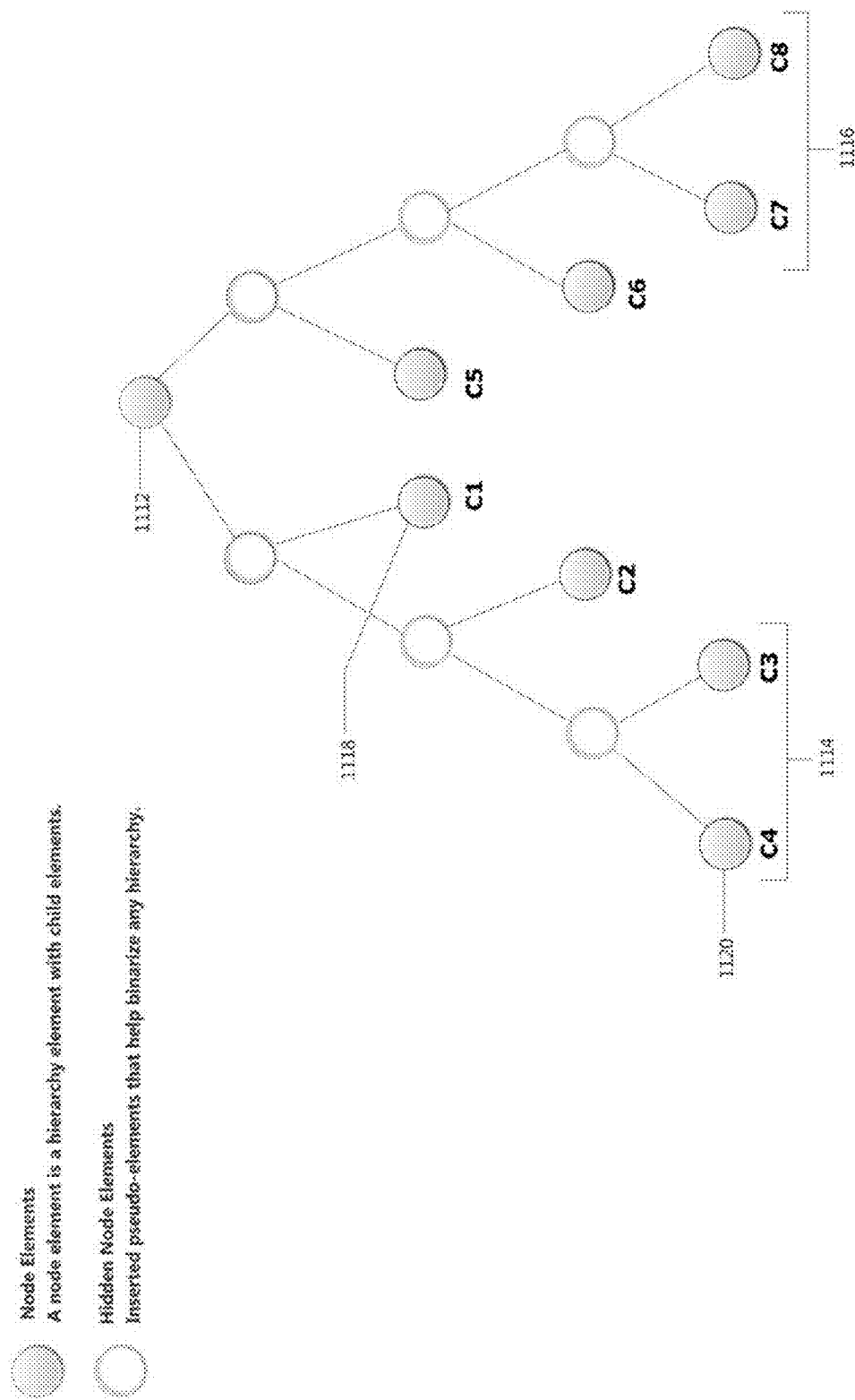
FIG. 11C shows an exemplar unbalanced split in an exemplar 5-level hierarchy.

Splitting unequally would produce a more unbalanced structure, while splitting equally or close to equal would result in a more balanced structure. In FIG. 11B. the splitting was applied equally thus creating a more balanced, 4-level pseudo-hierarchy. Starting from the root element 1102 the binarization inserted hidden pseudo-elements 1104 and we can see that all node-elements positioned at the $4^{th}$ level 1106, for example C1 1108 and C4 1110. In contrast to that, FIG. 11C. shows an unbalanced splitting method. Starting from the same root element the method splits the child elements into two parts 1114, 1116, one element in the first part, all the others in the second part, recursively. Therefore the structure is unbalanced. In this example the binary hierarchy has 5 levels and the inserted pseudo-elements and the C1 1118 and C4 1120 node elements are positioned at a very different level. FIG. 11A has been provided to show an example binarized hierarchy.

FIG. 12 shows an exemplar simplified visualization in the visualization engine.

The actual partitioning and the placement of the sub-partitions and their content are made according to an invisible grid, but the design might visually merge sub-partitions into a single visualized box ex., 1202 which in this example is a rectangle and a "plus sign" 1204. Using the "plus sign" 1204 the user can zoom into that sub-partition showing more content and sub-partitions.

Methods for Enhancing Visualization

Alternate placement of different types of content (also referred to as "alternating")

It helps readability and provides better user experience if different type of content appears in an alternate way during visualization. In order to achieve this, the user content in the binary tree must be organized to support this rule. For example, given T{$t_1,t_2,t_3,t_4,t_5,t_6,t_7$} binary tree having $t_1$ as root node with $t_2$ as left child, $t_3$ as its right child, $t_4$ is left child of $t_2$, $t_5$ is right child of $t_2$, $t_6$ is left child of $t_3$ and $t_7$ is right child of $t_3$. Covering set nodes are $t_4,t_5,t_6,t_7$. In this example, content is placed alternately if $t_4$ contains picture and $t_5$ contains text type information, then $t_6$ must contain text type information and $t_7$ must contain picture. This results in that the textual information appears on the bottom side and the video/picture content on the top, in the adjacent partition they are positioned reverse, resulting in a better visualization and enhanced readability.

In FIG. 12, on the top-left partition the picture or video content is placed on the right sub-partition 1206, while on the bottom-left partition the same type content is positioned on the right 1208 resulting in an alternating visualization.

Several techniques support this behavior:

Within the editor, a user follows the rule (described below) and places the content following the alternating rule. Or, for binary hierarchies created apart from the editor, following the rule established during creation.

Implement a method in the editor and/or the visualization engine which detects non-alternating placement and trigger certain activities, for example, notify users.

A sample method is provided for detecting non-alternating placement of text and picture/video content within a binary hierarchy:

1. Given T as a binary tree and its covering set nodes listed from $c_1$ to $c_n$.
2. If a covering set node has sibling node which is also a covering set, we may group the siblings. For example $c_1$, $c_2$, $c_3$, $c_4$, $c_5$ are covering set nodes where $c_1$, $c_2$ are sibling nodes, $c_3$ has no sibling, $c_4$, $c_5$ are also sibling nodes, so we make group of them [$c_1$, $c_2$], $c_3$, [$c_4$, $c_5$].
3. As a rule, adjacent groups must alternate throughout the whole covering set by filtering not grouped elements, in this case $c_3$, therefore we get [$c_1$, $c_2$], [$c_4$, $c_5$].
4. This means that if $c_1$ contains text and $c_2$ contains video, $c_4$ should contain video and $c_5$ should contain text.

There might be numerous other rules to control this behavior, this one was provided as a sample.

Behavior at Zooming

Figure 13:
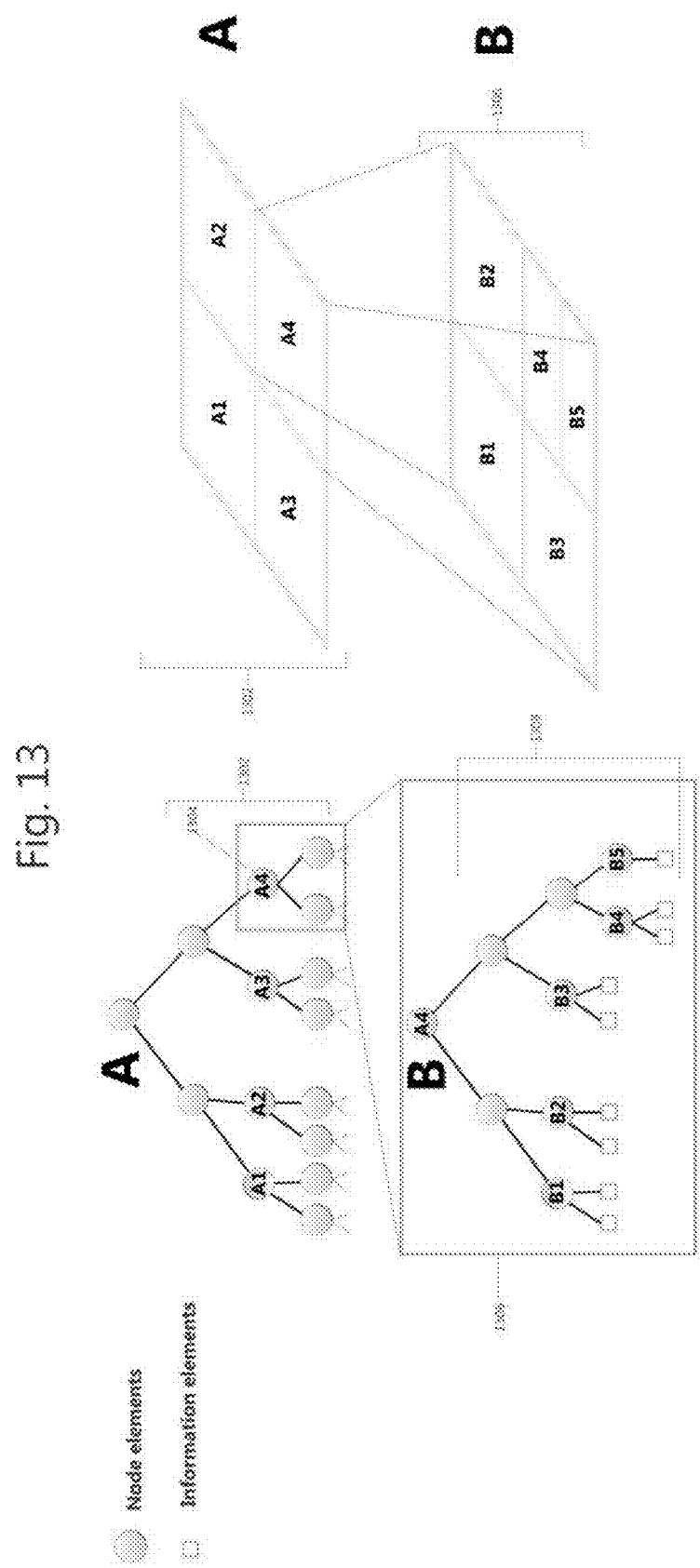
FIG. 13 shows navigating through covering sets.

FIG. 13 shows and example of zooming and drilling down in a partition and revealing its sub-partitions in a new covering set. The starting point is covering set A showing sub-partitions A1-A4. When the user zooms to sub-partition A4 1304, covering set B 1306 appears showing partition A4's child elements ranging from B1 to B5 1308. When the users go back (zooms out) covering set B is replaced by covering set A by the engine.

Windowing Technique

If the visualization space is bigger than the display area, a windowing technique is used. In smaller displays, such as cellphone displays, the projection space may be extended to be equal of the screen's bigger resolution, resulting a square-shaped projection space. As a result, the physical appearance of the partition-space will preferably not change when the cellphone is rotated. FIG. 14. shows a mobile phone with portrait 1402 and landscape 1404 orientation. The system virtually extends the display's lesser resolution to the original display's larger resolution to become a square. Therefore, when the cellphone resolution is x by y, where x has fewer pixels, virtual resolution would be y by y. The system's extended space, as a canvas behind the display is unchanged when the phone rotates. Other virtual spaces might apply using this windowing solution.

Interfaces

The user can navigate between partitions using various interfaces that the user's device provides (ps. keyboard, mouse, touching, speech interface, gestures, eye-movement, brain-interface etc.).

Optional Settings and Parameters

As alternatives and variations, the partitioning method might be adjusted in the following ways:

(a) During visualization the size of the partition might not be based on the stored proportions, it can be modified to follow an invisible grid as can be seen in FIG. 15 1502.

(b) Divert splitting from the halving or from the stored proportions. A limit may be set as maximum difference, for eg. −10-20% to +10%-20% 1602, as can be seen on FIG. 16. This means that if the partition is set to be split in 50%-50%, the engine may override this settings to maximum 30%-70% or 70%-30%.

(c) The resolution of the invisible grid may be increased when zooming in to a partition so as to better position the sub-partitions. On FIG. 17, when zooming to the partition A 1702 the sub-partitioning is taken place by using a higher-resolution grid. The positioning of the grid might be either global (meaning that only one global grid exists and when zooming in, the system may enhance the resolution of the global grid), or, it may be local, meaning that the system sets up a new, refined grid at sub-partition level.

Inserting Advertisements

A user may insert advertisement as end content as well. Ads may contain text, picture, video or combination of these, just like ordinary user content. The major advantages of the system's ads placement include:

- Structure is thematically organized therefore advertisements are contextual-targeted.
- Advertisements will be placed in the same way as regular user content, resulting in a better user experience than ordinary advertisements.

Ads may be inserted to any partition in the covering set. However, if halving splitting was used entirely during building the hierarchy, the space available for displaying the advertisement depends only on the depth of the tree, therefore it gives less variable sizes and easier to calculate.

FIG. 18 shows and example embodiment of the system whereby advertisement type content may be inserted in the hierarchy. For instance under the Business note 1802 (end content advertisement 1804), in Health and Entertainment 1806, end content advertisements 1808, 1810.

Example of Navigation Usage and Practical Applications

FIG. 19 demonstrates navigation in The system through an example which visualizes TV-channels. At the top of the screen the user may see the top level categories. This covering set at the starting level comprises partitions with aggregate content, so the topics rendered with larger rectangle (ps. movies-films, sport, science) may show more information. In this example an aggregate content is used, that mixes the output of two functions: one gives back the number of sub-elements with titled "categories" 1902 and the other selects a picture of a random channel in the category 1906 (for ex., there are 8 sub-elements in the Science category 1904 and the random picture is of a shark 1906). Other partitions are smaller (e.g. business/financial 1908, politics 1910, weather 1912, news 1914, etc.), and their aggregate content is set to use a smaller picture.

At the bottom of FIG. 19: when user zooms to science 1916 using the available interfaces (which event is device-dependent, for instance it can be a mouse-click, a finger-tap on that area, a command-word "go science", a gesture or a thought using brain-interface) the system zooms to that area. During zooming the available area for visualizing sub-partitions (science) grows, so additional elements (sub-channels) of "science" sub-partition can be shown. In this example, when the user zooms to the 8 channels science partition, the covering set splits into 6 sub-partitions with 4 different sized rectangles 1916. According to the available space of the new partition only the necessary information will be shown at each partition. In this example, science ch 4 1918, having the largest partition shows a screenshot of the actual channel plus information about the actual upcoming program. Science ch 1 1920 and science ch 8 1922 have smaller partitions and correspondingly smaller screenshots and a titles. In contrast, science ch 2 1924 and ch 3 1926 have only titles. In this example science channels 5, 6 and 7 (collectively 1928) share one partition at this covering set.

Example Practical Applications of the System

The accompanying drawings show various industry examples including, but not limited to news, media and education.

Figure 20:
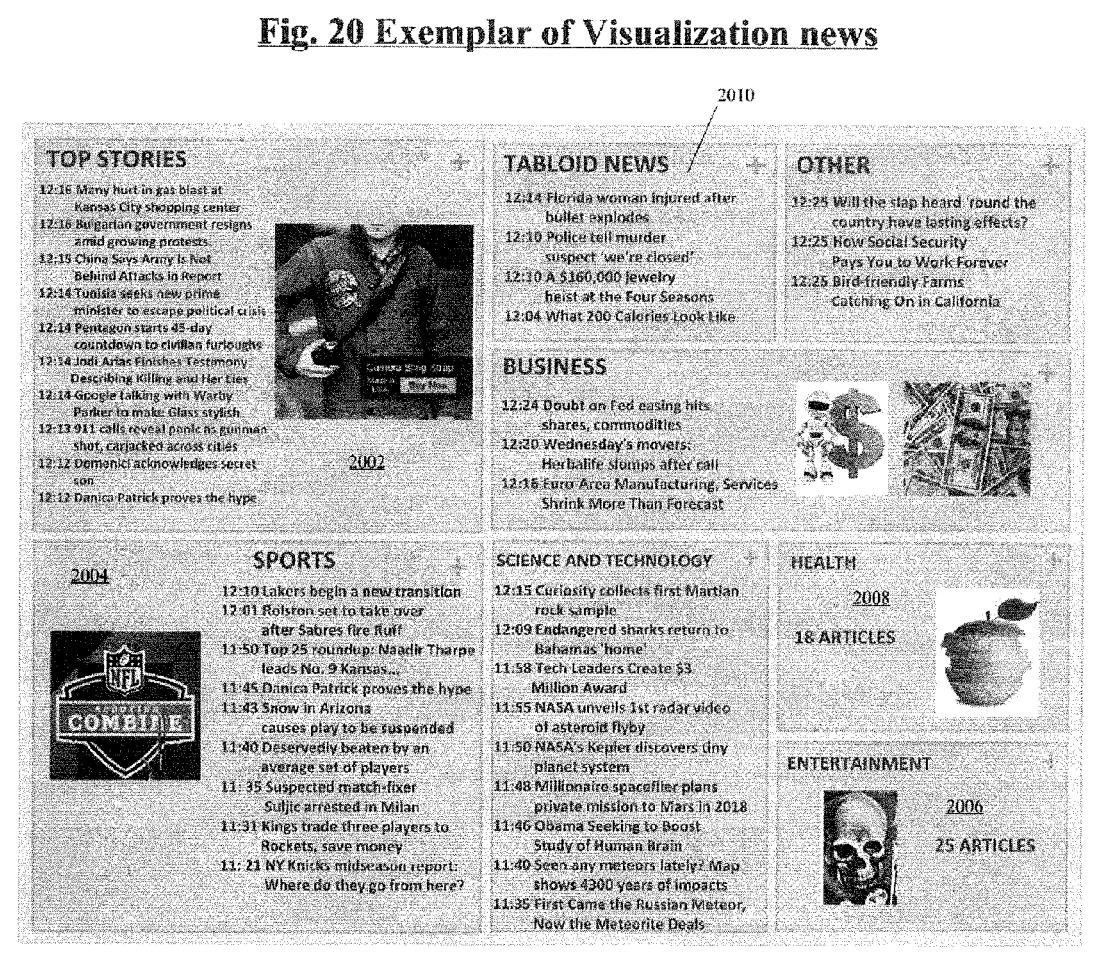

FIG. 20. illustrates an example of the system used to visualize news. In this example the information elements are news with date, time, title, abstract and relevant pictures. The world of news was partitioned into several nested sub-partitions and the covering set of the first level is shown. The partitions containing more leaf-elements are bigger ("Top Stories" 2002, "Sports" 2004) while the less important ones are rendered in smaller partitions ("Entertainment" 2006, "Health" 2008). According to visibility rules, the bigger partitions display news titles, dates, while the smaller partitions display the number of news within that sub-partition. With the plus sign 2010, users can zoom to a sub-partition and the zooming reveals the sub-partitions of the partition by visualizing a new covering set.

In this example of visualizing news the halving binarization method was used, so during splitting the partitions were split in two equal halves. As result, the area of the bigger rectangles are integer multiple of the smaller rectangles and there is a fix, calculable stock of different sized rectangles. In addition, an alternate splitting method was also used so the rectangles are closer to squares, which gives better visibility and content placement. Moreover, the design hides some of the upper node elements in the hierarchy so their rectangles that would normally surround visible rectangles were concealed for better visibility. The placement of the pictures alternates, for example between left and right, which gives better user experience (alternating placement of elements discussed previously in this disclosure).

FIG. 21 demonstrates the system applied in the area of education. In this possible application, the information elements are related to world of biology. The classical biological classification is visualized using binarization. The first, halving binarization step took place vertically, separating a single partition that contains sponges, comb jellies and deuterostomes 2102 from protostomes 2104. The second binarization took place horizontally; further separating partition of deuterostomes 2106 from the partition containing sponges and comb jellies 2108. Note that this splitting was not halving, as it maintains another proportion.

The partition deuterostomes 2106 reveals content from its sub-partitions by visualizing partition of echinoderms, vertebates, urochordata and cephalochordata. A user may zoom to a sub-partition and the zooming reveals the sub-partitions of the partition by visualizing a new covering set. Users zoom in the sub-partitions using the plus sign. In this possible embodiment using the plus sign of deuterostomes's partition the system zooms to all connected sub-partitions of deuterostomes, but a user may choose to zoom directly to any of the sub-partitions: echinoderm, urochordata, cephalochordate or vertebrates. Note that the design uses invisible partitioning grids for content placement at several partitions: for example pictures of vertebrates 2110 are in sub-partitions whose partitioning-grid is invisible, the grid cannot be seen 2112. For teachers, this helps in lesson preparation and serves as a demonstration and a guidance tool during their courses. Unlike traditional methods, a series of lessons in the system are like walking through different navigational paths revealing covering sets and partitions with educational content.

Returning to TV-channels, which were discussed above and shown in FIG. 19, it is important to highlight that this example originates from non-hierarchical sets of information, TV channels usually are not hierarchical. Therefore the system applied a binarization thus making a binarized hierarchy based on the type of contents in each channels. In this example a halving, alternate binarization was used to build up the hierarchy. For instance, in the news example, the area of the created rectangles are integer multiples of each other and there is a fixed stock of different sized rectangles. The system renders visualization, assigning each category a partition-space according to the underlying features, preferably using alternating placement of pictures/content. Note that a logo in the middle of this embodiment, as pictured for example purposes, might optionally have unique function, for example, users might select their favorite categories by moving content over the logo, so users may access their favorite contents directly.

Some practical applications of the editor and visualization engine include, but are not limited to the following:
a) Education (biology, history, geography, etc.).
b) Demonstration and introduction (company brochures, webpages, business cards, CVs, menucards, etc.).
c) Visualization of dynamic, real-time content (TV channels, news, weather, realtime feeds from information systems).

As a final note, the system may define traversal paths between elements and levels of the hierarchy. The editor is able to make animations using the defined traversal paths between the levels and elements of the hierarchy and share them in various formats (standard video, Youtube export, etc.).

System Architecture

Figure 22:
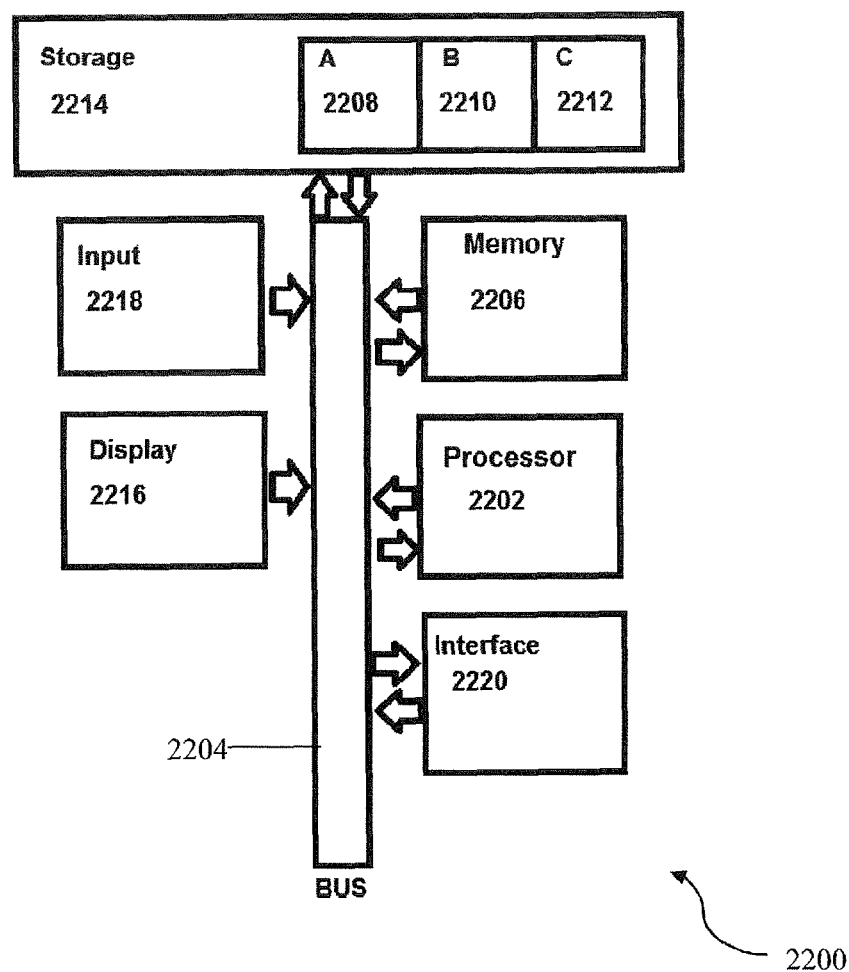
FIG. 22 is a system for displaying hierarchical information that includes an editor, according to an embodiment of the invention.

FIG. 22 is a system for displaying hierarchical information according to an embodiment. The system 2200 comprises a machine readable medium 2202, a display controller 2204, and a display 2206. In some embodiments, the system is representative of a specially programmed computer wherein the machine readable medium contains files that include program instructions for the editor ("editor module") and optionally, the visualization engine.

In one embodiment, the system includes an editor module, eg Module A in FIG. 22, which comprises at least computer readable media with program instructions necessary to execute method steps for creating and editing a hierarchy in the editor, whose function and method steps are detailed above. FIG. 22 shows an exemplary system 2200 for implementation of the disclosed technology, which includes a general-purpose computing device 2200, including a central processing unit (or processor) 2202 and a communication bus ("bus") 2204 that couples various system components including the system memory 2206 to the processor 2202. Modules can be configured to control the processor 2202 to perform various actions. Memory 2206 can include multiple different types of memory with different performance characteristics and may be read only memory and random access memory. The disclosure may operate on a computing device 2200 with more than one processor 2202 or on a group of networked computing devices. The processor 2202 can include any general purpose processor and a hardware module or software module, such as module A 2208, module B 2210, and module C 2212 stored in storage 2214, configured to control the processor 2201 as well as a special-purpose processor where program instructions are incorporated into the actual processor design. The processor 2202 may be a completely self-contained computing system, containing multiple cores or processors, a bus, memory controller, cache, etc. A multi-core processor may be symmetric or asymmetric.

The bus 2204 may be any of several types of bus structures including a memory bus or memory controller, a peripheral bus, and a local bus using any of a variety of bus architectures. A basic input/output (BIOS) stored in read only memory or the like, may provide the basic routine that to assist in the transfer of information between elements within the computing device 2200, such as during start-up.

The computing device 2200 further includes storage 2214 such as a hard disk drive, a magnetic disk drive, an optical disk drive, tape drive or the like. Storage 2214 can include software modules, eg., 2210 for controlling the processor 2102. Other hardware or software modules are contemplated. The storage device 2214 is connected to bus 2204 by a drive interface. The drives and the associated computer-readable storage media provide nonvolatile storage of computer-readable instructions, data structures, program modules and other data for the computing device 2200.

In one aspect, a hardware module that performs a particular function includes the software component stored in a non-transitory computer-readable medium in connection with the necessary hardware components, such as the processor 2202, bus 2204, display 2216, and so forth, to carry out the function. The "display" refers to visually perceptible display on a display device (such as a networked computing device for example, an end user's computing device) resulting from a tangible computer filed stored in its memory. This may originate from across a network, such as the Internet, a wireless communication network, or a system of connected networked computers. The display includes devices upon which information can be displayed in a manner perceptible to a user, such as a touchpad or touchscreen display, a computer monitor, an LED display, and the like means known in the art for producing visually perceptible output. The basic components are known to those with skill in the art and appropriate variations are contemplated depending on the type of device; the term "computing device" refers to any device with processing capability such that it can execute instructions, such as smartphones, PC computers, servers, telephones, and other similar devices.

Although the exemplary embodiment described herein employs the hard disk, storage 2214, those skilled in the art appreciate that other types of computer-readable media may also be used in the exemplary operating environment. Non-transitory computer-readable storage media expressly exclude media such as energy, carrier signals, electromagnetic waves, and signals per se.

To enable user interaction with the computing device 2200, an input device 2218 represents any number of input mechanisms, such as a microphone for speech, a touchscreen for gesture or graphical input, keyboard, mouse, motion input, speech, etc. An output device 2216 can also be one or more of a number of output mechanisms known to those of skill in the art. In some instances, multimodal systems enable a user to provide multiple types of input to communicate with the computing device 2200. The communications interface 2220 generally governs and manages the user input and system output. There is no restriction on operating on any particular hardware configuration and the basic componentry here may easily be substituted for improved hardware or firmware arrangements as they are developed.

The preferred system embodiment is presented as including individual functional blocks including functional blocks labeled as a "processor" or processor 2212. The functions of one or more processors may be provided by a single shared processor or multiple processors. (The term "processor" should not be construed to refer exclusively to hardware capable of executing software.) Illustrative embodiments may include microprocessor and/or digital signal processor hardware, read only memory for storing software performing the operations discussed above, and random access memory for storing results.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 2100 can practice all or part of the disclosed methods and/or can operate according to instructions in the recited non-transitory computer-readable storage media. Such logical operations can be implemented as modules configured to control the processor 2202 to perform particular functions according to the programming of the module. For example, FIG. 22 illustrates three modules Modules A-C which are modules controlling the processor 2202 to perform particular steps or a series of steps, however additional or fewer modules may be used. These modules may be stored on the storage device 2214 and loaded into random access memory or memory 2206 at runtime or may be stored as would be known in the art in other computer-readable memory locations.

What we claim is:

1. A visualization engine for visualizing a hierarchy, the visualization engine comprising at least a computing device having memory storing instructions that cause the computing device to display a covering set of a binary hierarchy using quadrangular shaped space partitions; wherein the visualization engine further comprises means for diverting proportional splitting of the partitions using an invisible grid.

2. A visualization engine for visualizing a hierarchy, the visualization engine comprising at least a computing device having memory storing instructions that cause the computing device to display a covering set of a binary hierarchy using quadrangular shaped space partitions, wherein the visualization engine further comprises means for establishing a maximum threshold of difference to proportional splitting.

3. The visualization engine as in claim 1, wherein the visualization engine further comprises means for increasing the resolution of the invisible grid.

4. A visualization engine for visualizing a hierarchy, the visualization engine comprising at least a computing device having a memory storing instructions that cause the computing device to display a covering set of binary hierarchy using quadrangular shaped space partitions, wherein the visualization engine further comprises means for alternating placement of text content and image content.

5. The visualization engine as in claim 1, wherein the visualization engine further comprises means for defining traversal paths in the hierarchy;

means for displaying the defined traversal paths as an animation which walks through the hierarchy;

and means for exporting the animated traversal paths as video.

* * * * *